United States Patent [19]

Gessell et al.

[11] Patent Number: 4,496,660

[45] Date of Patent: Jan. 29, 1985

[54] CATALYST PREPARED FROM ORGANO-MAGNESIUM COMPOUND; OXYGEN- OR NITROGEN-CONTAINING COMPOUND; HALIDE SOURCE; TRANSITION METAL COMPOUND AND REDUCING AGENT

[75] Inventors: Donald E. Gessell, Baton Rouge, La.; Ronald L. Gibbs, Midland, Mich.; Ricardo Fuentes, Jr., Baton Rouge, La.

[73] Assignee: The Dow Chemical Company, Midland, Mich.

[21] Appl. No.: 192,959

[22] Filed: Oct. 1, 1980

[51] Int. Cl.$^3$ ............................................... C08F 4/02
[52] U.S. Cl. ..................................... 502/111; 502/104; 502/113; 502/115; 502/118; 502/119; 502/120; 502/123; 502/124; 502/125; 502/127; 502/128; 502/226; 526/125
[58] Field of Search ............... 502/134, 120, 125, 127, 502/118, 123, 124, 125, 226, 119, 128, 115, 104, 111, 113

[56] References Cited

U.S. PATENT DOCUMENTS

| | | | |
|---|---|---|---|
| 2,956,993 | 10/1960 | Nowlin et al. | 260/94.9 |
| 3,334,079 | 8/1967 | Ralch et al. | 260/93.7 |
| 3,478,008 | 11/1969 | Ledbetter | 260/93.7 |
| 3,644,318 | 2/1972 | Diedrich | 260/88.2 |
| 3,878,124 | 4/1975 | Durand et al. | 252/429 B |
| 3,901,863 | 8/1975 | Berger et al. | 260/88.2 R |
| 3,951,935 | 4/1976 | Engelmann | 526/129 |
| 3,960,765 | 6/1976 | Shiga et al. | 252/429 B |
| 4,004,071 | 1/1977 | Aishima et al. | 526/116 |
| 4,006,101 | 2/1977 | Matsuura et al. | 252/429 C |
| 4,027,089 | 5/1977 | Aishima et al. | 526/127 |
| 4,039,472 | 8/1977 | Hoff | 252/429 C |
| 4,063,009 | 12/1977 | Ziegler et al. | 526/159 |
| 4,067,822 | 1/1978 | Gessell et al. | 252/429 B |
| 4,071,672 | 1/1978 | Kashiwa | 526/122 |
| 4,083,802 | 4/1978 | Matsuura et al. | 252/429 C |
| 4,085,276 | 4/1978 | Toyota et al. | 526/122 |
| 4,104,198 | 8/1978 | May, Jr. et al. | 252/429 B |
| 4,115,319 | 9/1978 | Scata et al. | 502/115 |
| 4,120,820 | 10/1978 | Birkelbach | 502/115 |
| 4,120,883 | 10/1978 | Sakurai et al. | 260/448 A |
| 4,136,058 | 1/1979 | Harris et al. | 252/429 B |
| 4,144,390 | 3/1979 | Derroitte et al. | 502/119 X |
| 4,187,385 | 2/1980 | Iwao et al. | 526/128 |
| 4,199,476 | 4/1980 | Melquist et al. | 252/431 R |
| 4,244,838 | 1/1981 | Gessell | 252/429 B |
| 4,246,383 | 1/1981 | Gessell | 526/92 |
| 4,283,515 | 8/1981 | Gibbs | 526/127 |
| 4,295,992 | 10/1981 | Gibbs | 252/429 C |
| 4,324,691 | 4/1982 | Hartshorn et al. | 502/115 X |

FOREIGN PATENT DOCUMENTS

| | | | |
|---|---|---|---|
| 845983 | 3/1977 | Belgium . | |
| 942734 | 2/1974 | Canada | 252/20 |
| 992051 | 6/1976 | Canada | 252/20 |
| 2758312 | 7/1978 | Fed. Rep. of Germany . | |
| 51-102086 | 9/1976 | Japan . | |
| 51-111281 | 10/1976 | Japan . | |
| 51-148785 | 12/1976 | Japan . | |
| 52-98076 | 8/1977 | Japan . | |
| 762246 | 3/1977 | South Africa . | |
| 1502567 | 3/1968 | United Kingdom . | |
| 1275641 | 12/1969 | United Kingdom . | |
| 1235062 | 6/1971 | United Kingdom . | |
| 1306001 | 2/1973 | United Kingdom . | |
| 1311013 | 3/1973 | United Kingdom . | |
| 1315770 | 5/1973 | United Kingdom . | |
| 1321766 | 6/1973 | United Kingdom . | |
| 1343781 | 1/1974 | United Kingdom . | |
| 1357474 | 6/1974 | United Kingdom . | |
| 1358437 | 7/1974 | United Kingdom . | |
| 1444736 | 8/1976 | United Kingdom . | |
| 1492379 | 11/1977 | United Kingdom . | |
| 1500873 | 2/1978 | United Kingdom . | |
| 1504930 | 3/1978 | United Kingdom . | |
| 1547269 | 6/1979 | United Kingdom . | |
| 2016020 | 9/1979 | United Kingdom . | |
| 1554248 | 10/1979 | United Kingdom . | |
| 2020672 | 11/1979 | United Kingdom . | |

OTHER PUBLICATIONS

Ethylene Polymerization Process With a Highly Active Ziegler–Natta Catalyst: 1. Kinetics, L. L. Bohn, Polymer, vol. 19, May 1978, pp. 553–561.

*Primary Examiner*—Patrick Garvin
*Attorney, Agent, or Firm*—J. G. Carter

[57] ABSTRACT

A catalyst for polymerizing olefins is the reaction product of (A) the reaction product of (1) the reaction product of (a) an alkyl magnesium compound such as dibutylmagnesium, with (b) an oxygen-containing and/or nitrogen-containing compound such as n-propyl alcohol, or isopropylamine, with (2) a halide source such as titanium tetrachloride or silicon tetrachloride; and (B) a transition metal compound such as titanium tetrachloride and (C) a reducing agent such as triisobutylaluminum.

Also disclosed is a non-transition metal containing catalyst support for use in preparing olefin polymerization catalysts.

The polymers which are produced in the presence of this catalyst and a cocatalyst such as triethylaluminum have a low catalyst support to transition metal ratio and therefore, the catalyst efficiency based on quantity of polymer per quantity of total catalyst is very high resulting in a polymer having good color and very little, if any, corrosion.

29 Claims, No Drawings

CATALYST PREPARED FROM ORGANO-MAGNESIUM COMPOUND; OXYGEN- OR NITROGEN-CONTAINING COMPOUND; HALIDE SOURCE; TRANSITION METAL COMPOUND AND REDUCING AGENT

BACKGROUND OF THE INVENTION

This invention relates to a new catalyst composition useful for initiating and promoting polymerization of one or more α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agent such as an aqueous basic solution. Such catalyst deactivation and/or removal procedures are expensive both in time and material consumed as well as the equipment required to carry out such treatment.

Moreover, most slurry polymerization processes employing the aforementioned known catalyst systems are accompanied by reactor fouling problems. As a result of such reactor fouling, it is necessary to frequently stop the process to clean the polymerization reactor.

In view of the foregoing problems encountered in the use of conventional Ziegler catalysts, it would be highly desirable to provide a polymerization catalyst which is sufficiently active to eliminate the need for catalyst residue removal and which minimizes reactor fouling problems. In slurry polymerization processes, it would be especially desirable to provide a high efficiency catalyst that will yield a polyolefin powder having increased bulk density.

SUMMARY OF THE INVENTION

The present invention in one aspect is a catalyst support which is the solid reaction product formed by reacting in an inert hydrocarbon diluent (1) the reaction product of (a) an organomagnesium compound or a hydrocarbyl or hydrocarbyloxy aluminum, zinc or boron mixture or complex thereof with (b) an oxygen-containing and/or nitrogen-containing compound; and (2) a halide source which is free of a transition metal.

For the purpose of describing the present invention, the organomagnesium compound and the mixture or complex of the organomagnesium compound and the hydrocarbyl or hydrocarbyloxy aluminum, zinc or boron compounds are represented by the formula $MgR_2 \cdot xMeR'_{x'}$ as hereinafter defined.

The oxygen-containing and/or nitrogen-containing compound is present in a quantity sufficient to lower the amount of hydrocarbyl groups present in component (1-a) such that the resultant product does not substantially reduce $TiCl_4$ at a temperature of about 25° C. The halide source is present in a quantity sufficient to convert essentially all of the groups which are attached to a magnesium atom in component (1a) to a halide group.

Another aspect of the present invention is the hydrocarbon insoluble solid reaction product of (A) the hydrocarbon insoluble solid reaction product of (1) the reaction product of (a) a hydrocarbyl magnesium compound or a hydrocarbyl or hydrocarbyloxy aluminum complex thereof with (b) an oxygen-containing and/or nitrogen-containing compound, with (2) a halide source; (B) a transition metal compound; and (C) a reducing agent.

The components are employed in quantities so as to provide a sufficient quantity of component (1-b) to lower the amount of hydrocarbyl groups present in component (1-a) such that the resultant product will not substantially reduce $TiCl_4$ at 25° C. At least a sufficient amount of halogen from component (2) is employed to convert essentially all of the groups attached to a magnesium atom in component (1) to a halide group. The quantity of component (B) is that which is sufficient to provide a Mg:Tm atomic ratio of from about 0.05:1 to about 50:1 preferably from about 0.1:1 to about 5:1 and most preferably from about 0.2:1 to about 1:1. Sufficient quantities of component (C) are employed so as to theoretically reduce essentially all of the transition metal.

The present invention concerns solid, hydrocarbon insoluble catalysts which when employed with an activator or cocatalyst are suitable for polymerizing α-olefins which catalysts are the inert diluent washed product resulting from the admixture of:

(I) The reaction product of
 (A) the reaction product of
  (1) a magnesium component or a mixture of such components represented by the formula $MgR_2 \cdot xMeR'_{x'}$ wherein each R is independently a hydrocarbyl group having from 1 to about 20, preferably from 1 to about 10 carbon atoms, each R' is independently hydrogen, a hydrocarbyl or a hydrocarbyloxy group having from 1 to about 20, preferably from 1 to about 10 carbon atoms, Me is Al, Zn or B, x has a value from zero to 10, x' has a value equal to the valence of Me, and (2) an oxygen-containing and/or nitrogen-containing compound in a quantity sufficient to lower the amount of hydrocarbyl groups present in component (A-1) such that the resultant product does not substantially reduce TiCl$_4$ at a temperature of about 25° C.; and (B) a suitable halide source or mixture thereof represented by the formulas AlR$_{3-a}$X$_a$, SiR$_{4-b}$X$_b$, SnR$_{4-b}$X$_b$, POX$_3$, PX$_3$, PX$_5$, SO$_2$X$_2$, GeX$_4$, R$^4$(CO)X, TmY$_n$X$_{z-n}$ and RX wherein each R is independently hydrogen, a hydrocarbyl or a hydrocarbyloxy group having from 1 to about 20 carbon atoms, preferably from 1 to about 10 carbon atoms; each R$^4$ is independently hydrogen or a hydrocarbyl group having from 1 to about 20 carbon atoms, preferably from 1 to about 10 carbon atoms; each X is a halogen atom such as chlorine or bromine; a has a value of from 1 to 3; b has a value of from 1 to 4; Tm is a metal selected from groups IV-B, V-B or VI-B of the Periodic Table of Elements; Y is oxygen, OR", or NR"$_2$; each R" is independently hydrogen or a hydrocarbyl group having from 1 to about 20 carbon atoms, z has a value equal to the valence of said transition metal, n has a value of from zero to 5 with the value of z-n being from at least 1 up to a value equal to the valence of the transition metal; said halide source being present in a quantity sufficient to convert essentially all of the groups attached to a magnesium atom in component (A) to a halide group;

(II) a transition metal compound represented by the formula TmY$_n$X$_{z-n}$ wherein Tm, Y, X, z and n are as defined above; n has a value from zero to 5 with z-n being from zero up to a value equal to the valence of the transition metal in a quantity so as to provide a Mg:Tm atomic ratio of from about 0.05:1 to about 50:1, preferably from about 0.1:1 to about 5:1, most preferably from about 0.2:1 to about 1:1; and (III) a suitable reducing agent or mixture of reducing agents represented by the formulas B(R$^3$)$_{3-m}$X$_m$, Al(R$^3$)$_{3-m}$X$_m$, ZnR$^3{}_2$, MgR$^3$X or MgR$^3{}_2$ wherein each X is independently a halogen, a hydrocarbyloxy group having from 1 to about 20, preferably from 1 to about 10 carbon atoms or an NR$^3{}_2$ group; each R$^3$ is independently hydrogen or a hydrocarbyl group having from 1 to about 20, preferably from 1 to about 10 carbon atoms; m has a value from zero to 2; said reducing agent being employed in a quantity so as to provide an R$^3$:Tm ratio of from about 1:1 to about 50:1 preferably from 1:1 to about 10:1 and most preferably from about 1:1 to about 3:1.

When in the above catalyst the halide source is a reducing halide source, the reducing agent (III) can be omitted resulting in still another aspect of the present invention which is the inert diluent washed hydrocarbon insoluble catalyst which comprises:

(I) The reaction product of
  (A) the reaction product of
    (1) a magnesium component or a mixture of such components represented by the formula MgR$_2$.xMeR'$_{x'}$ wherein each R is independently a hydrocarbyl group having from 1 to about 20, preferably from 1 to about 10 carbon atoms, each R' is independently hydrogen, a hydrocarbyl or a hydrocarbyloxy group having from 1 to about 20, preferably from 1 to about 10 carbon atoms, Me is Al, Zn or B, x has a value from zero to 10, x' has a value equal to the valence of Me, and
    (2) an oxygen-containing and/or a nitrogen-containing compound in a quantity sufficient to lower the amount of hydrocarbyl groups present in component (A-1) such that the resultant product does not substantially reduce TiCl$_4$ at a temperature of about 25° C.;
  (B) a suitable reducing halide source represented by the formula Al(R$^3$)$_{3-a}$X$_a$ wherein R$^3$ is independently hydrogen or the same definition as R above, X is as defined above and a has a value from 1 to less than 3; said halide source being employed in a quantity sufficient to convert essentially all of the groups attached to a magnesium atom to a halide group and to provide an R$^3$:Tm ratio of from about 1:1 to about 50:1, preferably from about 1:1 to about 10:1 and most preferably from about 1:1 to about 3:1;
  (C) a transition metal compound represented by the formula wherein TmY$_n$X$_{z-n}$ wherein Tm is a metal selected from groups IV-B, V-B or VI-B of the Periodic Table of Elements; Y is oxygen, OR" or NR"$_2$; X is a halogen; each R" is independently hydrogen or a hydrocarbyl group having from 1 to about 20 carbon atoms; n has a value from zero to 5 with z-n being from one up to a value equal to the valence of the transition metal in a quantity so as to provide a Mg:Tm atomic ratio of from about 0.05:1 to about 50:1, preferably from about 0.1:1 to about 5:1.

A further aspect of the present invention is a process for preparing a hydrocarbon insoluble catalyst which comprises:

(I) reacting in an inert diluent
  (A) the reaction product of
    (1) a magnesium component or a mixture of such components represented by the formula MgR$_2$.xMeR'$_{x'}$ wherein each R is independently hydrogen, a hydrocarbyl group having from 1 to about 20, preferably from 1 to about 10 carbon atoms, each R' is independently hydrogen, hydrocarbyl or a hydrocarbyloxy group having from 1 to about 20, preferably from 1 to about 10 carbon atoms, Me is Al, B or Zn, x has a value from zero to 10, x' has a value equal to the valence of Me,
    (2) a oxygen-containing and/or nitrogen-containing compound in a quantity sufficient to lower the amount of hydrocarbyl groups present in component (A-1) such that the the resultant product does not substantially reduce TiCl$_4$ at a temperature of about 25° C.; and
  (B) a suitable halide source or mixture thereof represented by the formulas AlR$_{3-a}$X$_a$, SiR$_{4-b}$X$_b$, SnR$_{4-b}$X$_b$, POX$_3$, PX$_3$, PX$_5$, SO$_2$X$_2$, GeX$_4$, R$^4$(CO)X, TmY$_n$X$_{z-n}$ and R$^4$X wherein each R is independently hydrogen, a hydrocarbyl group or a hydrocarbyloxy group as hereinbefore defined, R$^4$ is hydrogen or a hydrocarbyl group having from 1 to about 20, preferably from 1 to about 10 carbon atoms; each X is a halogen atom such as chlorine or bromine; a has a value of from 1 to 3; b has a value of from 1 to 4; Tm is a metal selected from groups IV-B, V-B or VI-B of the Periodic Table of Elements; Y is oxygen, OR", or NR"$_2$; each R" is independently hydrogen or a hydrocarbyl group having from 1 to about 20 carbon atoms, z has a value equal to the valence of said transition metal, n has a value of from zero to 5 with the value of z-n being from at least 1 up to a value equal to the valence of the transition metal; said halide source being present in a quantity sufficient to convert essentially all of the groups attached to a magnesium atom in component (A) to a halide group;

(II) recovering the resultant hydrocarbon insoluble product, washing said product with fresh inert diluent;

(III) mixing, in fresh inert diluent, the product from (II) with (C) a transition metal compound represented by the formula TmY$_n$X$_{z-n}$ wherein Tm, Y, X, z and n are as defined above; z-n has a value from zero up to a value equal to the valence of the transition metal in a quantity so as to provide a Mg:Tm atomic ratio of from about 0.05:1 to about 50:1, preferably from about 0.1:1 to about 5:1, most preferably from about 0.2:1 to about 1:1;

(IV) reacting the mixture from (III) with (D) a suitable reducing agent or mixture of reducing agents selected from compounds represented by the formulas B(R$^3$)$_{3-m}$X$_m$, Al(R$^3$)$_{3-m}$X$_m$, ZnR$^3{}_2$, ZnR$^3$X, MgR$^3$X or MgR$^3{}_2$ wherein each X is independently a halogen, a hydrocarbyloxy group having from 1 to about 20, preferably from 1 to about 10 carbon atoms or a NR$^3{}_2$ group; each R$^3$ is independently hydrogen or a hydrocarbyl group having from 1 to about 20, preferably from 1 to about 10 carbon atoms; m has a value from zero to 2, said reducing agent being employed in a quantity so as to provide an R$^3$:Tm ratio of from about 1:1 to about 50:1 preferably from 1:1 to about 10:1 and most preferably from about 1:1 to about 3:1; and (V) recovering and washing with fresh inert diluent the resultant solid hydrocarbon insoluble catalyst produced in step (IV).

When in the above process the halide source is a reducing halide source, the recovery step II and the reducing agent (IV) can be omitted resulting in still another aspect of the present invention which is a process for preparing a hydrocarbon insoluble catalyst which comprises:

(I) reacting in an inert diluent
 (A) the reaction product of
  (1) a magnesium component or a mixture of such components represented by the formula MgR$_2$.xMeR'$_{x'}$; wherein each R is independently a hydrocarbyl group having from 1 to about 20, preferably from 1 to about 10 carbon atoms, each R' is independently hydrogen, a hydrocarbyl or a hydrocarbyloxy group having from 1 to about 20, preferably from 1 to about 10 carbon atoms; Me is Al, Zn or B; x has a value from zero to 10 and x' has a value equal to the valence of Me; with
  (2) an oxygen-containing and/or nitrogen-containing compound in a quantity sufficient to lower the amount of hydrocarbyl groups present in component (A-1) such that the resultant product does not substantially reduce TiCl$_4$ at a temperature of about 25° C.; and
 (B) a suitable reducing halide source represented by the formula AlR$^3{}_{3-a}$X$_a$ wherein each X is a halogen atom, preferably chlorine, R$^3$ is hydrogen or a hydrocarbyl group as defined above and a has a value from 1 to less than 3; in a quantity so as to provide an R$^3$:Ti ratio of from 1:1 to about 50:1, preferably from about 1:1 to about 10:1 and to provide sufficient halogen atoms to convert essentially all of the groups attached to a magnesium atom in component (A) to a halide group; and
 (C) a transition metal compound represented by the formula TmY$_n$X$_{z-n}$ wherein Tm is a metal selected from groups IV-B, V-B or VI-B of the Periodic Table of Elements; Y is oxygen, OR" or NR"$_2$; X is a halogen; each R" is independently hydrogen or a hydrocarbyl group having from 1 to about 20, preferably from 1 to about 10 carbon atoms; n has a value from zero to 5 with z-n being from one up to a value equal to the valence of the transition metal in a quantity so as to provide a Mg:Tm atomic ratio of from about 0.05:1 to about 50:1, preferably from about 0.1:1 to about 5:1; and (II) recovering and washing with fresh inert diluent the resultant solid, hydrocarbon insoluble catalyst.

A further aspect of the invention is a process for polymerizing α-olefins or mixtures thereof which comprises conducting the polymerization in the presence of the aforementioned catalysts.

DESCRIPTION OF THE PREFERRED EMBODIMENTS

The organomagnesium compounds which are suitably employed in the present invention include those represented by the formula R$_2$Mg.xMeR'$_{x'}$ wherein each R is independently a hydrocarbyl group and each R' is independently a hydrogen, hydrocarbyl or hydrocarbyloxy group, Me is Al, Zn or B, x has a value from 0 to 10 and x' has a value equal to the valence of Me.

The term hydrocarbyl as employed herein refers to a monovalent hydrocarbon radical such as alkyl, cycloalkyl, aryl, aralkyl, alkenyl and similar hydrocarbon radicals having from 1 to about 20 carbon atoms with alkyl having from 1 to 10 carbon atoms being preferred.

The term hydrocarbyloxy as employed herein refers to monovalent oxyhydrocarbon radicals such as alkoxy, cycloalkoxy, aryloxy, aralkoxy, alkenoxy and similar oxyhydrocarbon atoms having from 1 to about 20 carbon atoms with alkoxy groups having from 1 to 10 carbon atoms being the preferred hydrocarbyloxy radicals.

The quantity of MeR'$_{x'}$, i.e. the value of x, is preferably the minimum amount which is sufficient to render the magnesium compound soluble in the inert solvent or diluent which is usually a hydrocarbon or mixture of hydrocarbons. The value of x therefore is from zero to about 10, usually from about 0.2 to about 2.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-(n-octyl) magnesium, butyl octyl and such complexes as di-n-butyl magnesium.1/3 aluminum triethyl, di-(n-butyl) magnesium.1/6 aluminum triethyl, mixtures thereof and the like.

Suitable oxygen-containing compounds include, for example, water, carbon dioxide, carbon monoxide, sulfur dioxide, hydroxyl-containing organic compounds such as alcohols, glycols polyoxyalkylene glycols and the like, aldehydes, ketones, acetals, ketals, carboxylic acids, carboxylic acid esters, orthoesters or halides, carboxylic acid anhydrides, organic carbonates, mixtures thereof and the like.

Suitable nitrogen-containing compounds which can be employed herein include, for example, ammonia, amines, nitriles, amides, oximes, imides, isocyanates, mixtures thereof and the like.

Suitable hydroxyl-containing compounds include those represented by the formulas $$R{+}O{-}R'{\rangle_n}OH \text{ and } Z{+}{+}O{-}R'{\rangle_n}O{-}R''{]_{n'}}$$

wherein each R is a hydrocarbyl group having from 1 to about 20 preferably from 1 to about 10 carbon atoms or a halogen, NHR or $NH_2$ substituted hydrocarbyl group having from 1 to about 20 preferably from 1 to about 10 carbon atoms, each R' is independently a divalent hydrocarbyl group having from 1 to about 20 preferably from 1 to about 10 carbon atoms, each R'' is independently hydrogen, a hydrocarbyl group having from 1 to about 20 preferably from 1 to 10 carbon atoms or a halogen, NHR or $NH_2$ substituted hydrocarbyl group having from 1 to about 20 preferably from 1 to about 10 carbon atoms, at least one of which is hydrogen, Z is a multivalent organic radical containing from 2 to about 20 carbon atoms, n has a value from zero to about 10 and n' has a value of from 2 to about 10.

Particularly suitable hydroxyl-containing compounds include alcohols such as for example methyl alcohol, ethyl alcohol, n-propyl alcohol, isopropyl alcohol, n-butyl alcohol, sec-butyl alcohol, tert-butyl alcohol, octadecyl alcohol, glycols, 1,2-butylene glycol, 1,3-propylene glycol, 1,4-butanediol, 1,6-hexane diol, other hydroxyl containing compounds such as, for example, glycerine, trimethylol propane, hexane triol, phenol, 2,6-di-tert-butyl-4-methylphenol, mixtures thereof and the like. Also suitable are the adducts of ethylene oxide, 1,2-propylene oxide, 1,2-butylene oxide, 2,3-butylene oxide, styrene oxide or mixtures of such oxides with the previously mentioned or other hydroxyl-containing compounds such as pentaerythritol, sucrose, sorbitol and the like, as well as the alkyl and aryl capped hydroxyl-containing compounds so long as there remains at least 1 hydroxyl group per molecule.

Suitable aldehydes which can be employed herein include those aldehydes represented by the formula

  (I)

wherein R is hydrogen or a hydrocarbyl group having from 1 to about 20 carbon atoms, preferably an aliphatic hydrocarbyl group having from 1 to about 10 carbon atoms. Particularly suitable aldehydes include, for example, formaldehyde, acetaldehyde, propionaldehyde, butryaldehyde, benzaldehyde, mixtures thereof and the like.

Suitable ketones which can be employed herein include, for example, those represented by the formula

  (II)

wherein each R is independently a hydrocarbyl group having from 1 to about 20 carbon atoms, preferably from 1 to about 10 carbon atoms. Particularly suitable ketones include, for example, acetone, methyl ethyl ketone, 2,6-dimethyl-4-heptanone, mixtures thereof and the like.

The oxygen-containing compounds, particularly the alcohols, aldehydes and ketones can contain up to about 50 percent, preferably about 1 percent or less water by weight.

Suitable carboxylic acids which can be employed herein include those represented by the formulas

  (IV)

  (V)

wherein each R is a hydrocarbyl group having from 1 to about 20 carbon atoms, particularly from about 1 to about 10 carbon atoms. Particularly suitable carboxylic acids include, for example, formic acid, acetic acid, propionic acid, oxalic acid, benzoic acid, 2-ethylhexanoic acid, acrylic acid, methacrylic acid, mixtures thereof and the like.

Suitable acetals which can be employed herein include, for example, those represented by the formula

  (VI)

wherein each R is independently a hydrocarbyl group having from 1 to about 20 carbon atoms, preferably from 1 to about 10 carbon atoms. Particularly suitable acetals which can be employed includes, for example, acetal, 1,1-diethoxypropane, mixtures thereof and the like.

Suitable ketals which can be employed herein include, for example, those represented by the formula

  (VII)

wherein each R is independently a hydrocarbyl group having from 1 to about 20 carbon atoms, preferably from 1 to about 10 carbon atoms. Particularly suitable ketals include, for example, 2,2-dimethoxypropane, 2,2-dimethoxyhexane, 2,2-diethoxypropane, mixtures thereof and the like.

Suitable esters of carboxylic acids which can be employed herein include, for example, those represented by the formulas

  (VIII)

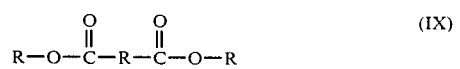  (IX)

wherein each R is independently a hydrocarbyl group having from 1 to about 20 carbon atoms, preferably from 1 to about 10 carbon atoms. Particularly suitable esters include, for example, ethyl acetate, ethyl formate, ethyl benzoate, methyl acetate, methyl formate, mixtures thereof and the like.

Suitable orthoesters which can be employed herein include, for example, those represented by the formula

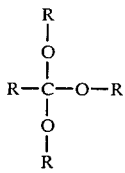
(X)

wherein each R is independently a hydrocarbyl group having from 1 to about 20 carbon atoms, preferably from 1 to about 10 carbon atoms. Particularly suitable orthoesters include, for example, triethylorthoformate, triethylorthoacetate, mixtures thereof and the like.

Suitable carboxylic acid halides include those represented by the formulas

(XI)

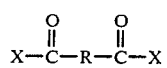
(XII)

wherein each R is independently a hydrocarbyl group having from 1 to about 20 carbon atoms, preferably from 1 to about 10 carbon atoms and each X is a halogen, preferably chlorine or bromine. Particularly suitable acid halides include, for example, acetyl chloride, oxalyl chloride, propionyl chloride, benzoyl chloride, mixtures thereof and the like.

Suitable organic carbonates which can be employed herein include, for example, those represented by the formulas

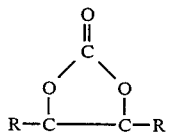
(XIII)

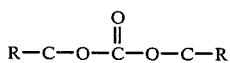
(XIV)

wherein each R is independently a hydrocarbyl group having from 1 to about 20 carbon atoms, preferably from 1 to about 10 carbon atoms. Particularly suitable carbonates include, for example, diethylcarbonate, ethylene carbonate, dipropylcarbonate, propylene carbonate, styrene carbonate, mixtures thereof and the like.

Suitable carboxylic acid anhydrides include, for example, those represented by the formulas

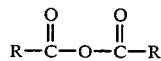
(XV)

(XVI)

wherein each R is independently a hydrocarbyl group having from 1 to about 20 carbon atoms, preferably from 1 to about 10 carbon atoms. Particularly suitable anhydrides include, for example, acetic anhydride, propionic anhydride, mixtures thereof and the like.

Suitable amines which can be employed herein include, for example, those represented by the formula

(XVII)

wherein each R is independently hydrogen, a hydroxyl or a hydrocarbyl group having from 1 to about 20, preferably from 1 to about 10 carbon atoms. Particularly suitable amines include, for example, ammonia, ethylamine, diethylamine, diisopropylamine, isopropylamine, hydroxylamine, mixtures thereof and the like.

Suitable amides which can be employed herein include, for example, those represented by the formula,

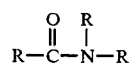
(XVIII)

wherein each R is independently hydrogen or a hydrocarbyl group having from 1 to about 20, preferably from 1 to about 10 carbon atoms. Particularly suitable amides include, for example, formamide, N,N-dimethylformamide, mixtures thereof and the like.

Suitable imides which can be employed herein include, for example, those represented by the formula

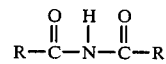
(XIX)

wherein each R is independently hydrogen or a hydrocarbyl group having from 1 to about 20, preferably from 1 to about 10 carbon atoms. Particularly suitable imides include, for example, succinimide, phthalimide, mixtures thereof and the like.

Suitable oximes which can be employed herein include, for example, those represented by the formulas $$R_2-C=N-OH \quad (XX)$$

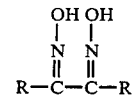
(XXI)

wherein each R is independently hydrogen or a hydrocarbyl group having from 1 to about 20, preferably from 1 to about 10 carbon atoms. Particularly suitable oximes include, for example dimethylglyoxime, formamidoxime, acetoxime, acetaldoxime, methyl ethyl ketoxime, mixtures thereof and the like.

Suitable nitriles which can be employed herein include, for example, those represented by the formula $$R-C\equiv N \quad (XXII)$$

wherein R is hydrogen or a hydrocarbyl group having from 1 to about 20, preferably from 1 to about 10 carbon atoms. Particularly suitable nitriles include, for example, hydrocyanic acid, acetonitrile, propionitrile, acrylonitrile, mixtures thereof and the like.

Suitable isocyanates which can be employed herein include, for example, those represented by the formulas

 (XXIII)

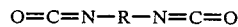 (XXIV)

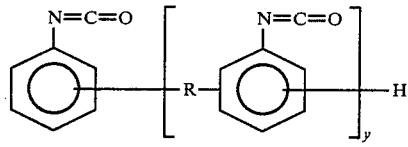 (XXV)

wherein each R is independently a hydrocarbyl group having from 1 to about 20, preferably from 1 to about 10 carbon atoms and y has an average value from about 1.01 to about 6. Particularly suitable isocyanates which can be employed herein include, for example, methyl isocyanate, ethyl isocyanate, methyl diisocyanate, toluene diisocyanate, methylene diphenyl diisocyanate, polymethylene polyphenylisocyanate, mixtures thereof and the like.

If desired, the oxygen- or nitrogen-containing compound can have dissolved or finely dispersed therein one or more transition metal compound(s) represented by the formula $Tm'Y_nX_{z-n}$ wherein $Tm'$ is a transition metal selected from groups IV-B, V-B, VI-B, VII-B, VIII, I-B of the Periodic Table of the Elements; Y is oxygen, OR'' or $NR_2''$; R'' is hydrogen or a hydrocarbyl group having from 1 to about 20, preferably from 1 to about 10 carbon atoms; X is a halogen atom, preferably chlorine or bromine; z has a value corresponding to the valence of the transition metal, Tm'; n has a value of from zero to 5; and the value of z-n is from zero up to the valence of the transition metal, Tm'.

Particularly suitable transition metal compounds include, for example, $CoCl_2$, $CoCl_2.6H_2O$, $NiCl_2$, $NiCl_2.6H_2O$, $FeCl_3.6H_2O$, $FeCl_3$, $FeCl_2$, $CrCl_3$, $CrCl_2$, $CrCl_3.6H_2O$, $MoCl_5$, $WCX_6$, $ZrCl_4$, $Zr(O-iC_3H_7)_4$, $VOCl_3$, mixtures thereof and the like.

The transition metal compound, when employed, is in a quantity so as to provide a Tm':Tm atomic ratio of from about 0.01:1 to about 0.5:1, preferably from about 0.02:1 to about 0.2:1. Also, the transition metals represented by Tm and Tm' are different. In other words, the transition metal portion of the compound dissolved or finely dispersed in the oxygen or nitrogen-containing compound is different from the transition metal portion of the transition metal compound subsequently employed in preparing the catalyst of the present invention. By employing such transition metal compounds with the oxygen-containing or nitrogen-containing compounds, properties of the polymers produced by polymerizing the monomer(s) in the presence of catalysts prepared therefrom are usually altered. Such properties include (1) the melt index of the polymer produced at a given hydrogen concentration in the polymerization reactor and/or (2) the polymer powder bulk density of a polymer produced under slurry polymerization conditions or by gas phase polymerization.

Suitable halide sources which can be employed herein include those represented by the formulas $AlR_{3-a}X_a$, $SiR_{4-b}X_b$, $SnR_{4-b}X_b$, $POX_3$, $PS_3$, $PX_5$, $SO_2X_2$, $GeX_4$, HX, R(CO)X and RX wherein each R is independently hydrogen, a hydrocarbyl group or a hydrocarbyloxy group as hereinbefore defined, each X is a halogen atom such as chlorine or bromine, a has a value of from 1 to 3 and b has a value of from 1 to 4.

When the halide source is a hydrocarbyl halide, it should contain a labile halogen at least as active i.e., easily lost to another compound, as the halogen of sec-butyl chloride, preferably as active as t-butyl chloride.

Particularly suitable halide sources include, for example, silicon tetrachloride, tin tetrachloride, aluminum trichloride, trichlorosilane, dimethyldichlorosilane, methyltrichlorosilane, methyldichlorosilane, ethylaluminum dichloride, diethylaluminum chloride, ethylaluminumsesquichloride, phosphorus oxytrichloride, phosphorus trichloride, hydrogen chloride, t-butyl chloride, benzyl chloride, benzoyl chloride, acetyl chloride, mixtures thereof and the like.

Suitable halide sources also include hydrocarbon soluble transition metal halide compounds represented by the formula $TmY_nX_{z-n}$ wherein Tm is a transition metal selected from groups IV-B, V-B and VI-B of the Periodic Table of the Elements, Y is oxygen, OR'' or $NR_2''$; each R'' is independently hydrogen or a hydrocarbyl group as previously defined; X is a halogen, preferably chlorine or bromine; z has a value corresponding to the valence of the transition metal, Tm; n has a value of from zero to 5 with the value of z-n being from at least 1 up to a value equal to the valence state of the transition metal, Tm.

Particularly suitable transition metal halide compounds include, those compounds of titanium, zirconium, vanadium and chromium such as, for example, titanium tetrachloride, titanium tetrabromide, dibutoxy titanium dichloride, monoethoxy titanium trichloride, isopropoxy titanium trichloride, chromyl chloride, vanadium oxytrichloride, zirconium tetrachloride, vanadium tetrachloride, mixtures thereof and the like.

Suitable reducing agents include those represented by the formulas $Al(R^3)_{3-m}X_m$, $B(R^3)_{3-m}X_m$, $ZnR^3_2$, $ZnR^3X$, $MgR^3X$ or $MgR^3_2$ including mixtures thereof wherein each $R^3$ is independently hydrogen or a hydrocarbyl group as hereinbefore defined; X is a halogen, preferably chlorine or bromine, a hydrocarbyloxy group as hereinbefore defined, or a $NR^3_2$ group; $R^3$ being as previous defined; m has a value from zero to 2, preferably zero or 1.

Particularly suitable reducing agents include, for example, triethylaluminum, ethylaluminum dichloride, diethylaluminum chloride, triisobutylaluminum, ethylaluminum sesquichloride, diisobutylaluminum hydride, trimethylaluminum, triethylboron, diethylzinc, dibutylmagnesium butylethyl magnesium, mixtures thereof and the like.

The reducing agents are employed in quantities so as to provide an $R^3$:Tm ratio of from about 1:1 to about 50:1, preferably from about 1:1 to about 10:1, and most preferably from about 1:1 to about 3:1. The ratio is the number of $R^3$ groups for each atom of transition metal.

Suitable transition metal compounds which can be employed include those represented by the formula $TmY_nX_{z-n}$, wherein Tm is a transition metal in its highest stable valence state and being selected from groups IV-B, V-B and VI-B of the Periodic Table of the Elements; Y is oxygen, OR'' or $NR_2''$; R'' is hydrogen or a hydrocarbyl group having from 1 to about 20 carbon atoms; X is a halogen, preferably chlorine or bromine; z has a value corresponding to the valence of the transition metal, Tm; n has a value of from zero to 5 with the value of z-n being from zero up to a value equal to the valence state of the transition metal, Tm.

Particularly suitable transition metal compounds include, for example, titanium tetrachloride, titanium tetrabromide, dibutoxy titanium dichloride, monoethoxy titanium trichloride, isopropoxytitanium trichloride, tetraisopropoxytitanium, chromyl chloride, vanadium oxytrichloride, zirconium tetrachloride, tetrabutoxyzirconium, vanadium tetrachloride, mixtures thereof and the like.

Suitable organic inert diluents in which the catalyst support and catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane dimethylcyclohexane, dodecane, eicosane industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

The catalyst and catalyst supports of the present invention are advantageously prepared under an inert atmosphere such as nitrogen, argon or other inert gas at temperatures in the range of from about −50° C. to about 200° C., preferably from about 0° C. to about 100° C. The time of mixing the various components is not critical; however, times of from about one minute to about thirty-six hours are deemed to be most desirable. The time is ordinarily that which will permit completion of the reaction at the reaction temperature. Rapid mixing of the catalyst components or poor agitation produces a catalyst which is relatively non-uniform with respect to particle size distribution amd produces polymers having an undesirably broad particle size distribution.

The magnesium compound, the optional aluminum, zinc or boron compound, and the oxygen-containing and/or nitrogen-containing compound may be mixed in any order of addition. A precipitate sometimes forms, depending upon the oxygen- or nitrogen-containing compound employed, when the oxygen-containing and/or nitrogen-containing compound and magnesium compound are mixed and lumps will form if the reactants are mixed with poor agitation, too rapidly or in too concentrated a mixture. These lumps result in a final catalyst which contains lumps which in turn produces a polymer under slurry polymerization conditions having an undesirably broad particle size distribution with a significant percentage of particles unable to pass through a 40 mesh screen. Addition of an aluminum, zinc or boron compound may result in a hydrocarbon solution of the magnesium compound and oxygen-containing and/or nitrogen-containing compound mixture and eliminates those previously mentioned undesirable effects. It is preferable to add the oxygen-containing and/or nitrogen-containing compound to a solution of the magnesium compound and the aluminum, zinc or boron compound so as to obtain a desirably uniform polymer particle size distribution.

When the catalyst of this invention is used in solution polymerization conditions the above mentioned catalyst particle size distribution is not as important. However, if an aluminum compound is added as a solubilizing agent the catalyst preparation is simplified when using closed metal vessels for the catalyst preparation, such as would be used in the commercial production of polymers and copolymers of ethylene.

Suitable cocatalysts or activators with which the catalysts of the present invention can be reacted, contacted or employed in the polymerization of α-olefins includes those aluminum, boron, zinc or magnesium compounds represented by the formulas $Al(R^3)_{3-a}X_a$, $B(R^3)_{3-a}X_a$, $MgR^3_2$, $MgR^3X$, $ZnR^3_2$ or mixtures thereof wherein X and $R^3$ are as previously defined and a has a value of from zero to 2, preferably zero to 1 and most preferably zero.

Particularly suitable cocatalysts or activators include, for example, diethylaluminum chloride, ethylaluminum dichloride, diethylaluminum bromide, triethylaluminum, triisobutylaluminum, triethylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the Al, B, Mg, Zn:Ti or mixtures thereof atomic ratio is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts i.e., up to about 25 weight percent based on the polymer of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar α-olefin or α-diolefin based on total monomer.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0° to about 300° C., preferably at slurry polymerization temperatures, e.g., from about 0° to about 95° C., more preferably from about 50° to 90° C., for a residence time of about 15 minutes to 24 hours, preferably 30 minutes to 8 hours. It is generally desirable to carry out the polymerization in the absence of moisture and oxygen and a catalytic amount of the catalytic reaction product is generally within the range from about 0.0001 to about 0.1 milligram-atoms titanium per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined as hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the melt index values $I_2$ and $I_{10}$ were determined by ASTM D 1238 conditions E and N respectively. The apparent bulk density was determined as an unsettled bulk density according to the procedure of ASTM 1895 employing a paint volumeter from the Sargent-Welch Scientific Company (catalog no. S-64985) as the cylinder instead of the one specified by the ASTM procedure.

GENERAL PROCEDURE

In each of the following examples, unless otherwise stated, the catalyst components were blended while in a gloved box filled with dry oxygen-free nitrogen.

In the examples, the dibutylmagnesium was a commercial material obtained as a solution in a heptane-hexane mixture from the Lithium Corporation of America, the dihexylmagnesium was a commercial material obtained as a hexane solution from the Ethyl Corporation, and the butylethylmagnesium was a commercial material obtained as a heptane solution from Texas Alkyls, Inc. All ratios are molar ratios unless otherwise indicated. The 1.46 molar diethylaluminum chloride, 0.616 molar triisobutylaluminum and 0.921 molar triethylaluminum were obtained as solutions in hexane from Ethyl Corporation or Texas Alkyls, Inc. Isopar ®E was obtained from Exxon Company USA and is a mixture of saturated paraffins having primarily 8 to 9 carbon atoms.

EXAMPLE 1

A. Catalyst Preparation 532 milliliters of a 0.470 molar dibutylmagnesium solution (250 millimoles) was added dropwise to a stirred solution of n-propylalcohol (38 ml, 505 millimoles) in hexane (400 ml). A solution of titanium tetrachloride (55 ml, 500 millimoles) in hexane (200 ml) was added dropwise to the resultant slurry with continuous stirring. 342 milliliters of 1.46 molar diethylaluminum chloride (500 millimoles) was added dropwise over a period of two hours with continuous stirring. The hydrocarbon insoluble products were allowed to settle and the supernatant solution was removed by decantation. The solids were reslurried with fresh hexane. The decantion procedure was repeated four more times to remove the hexane soluble reaction products.

B. Polymerization of Ethylene

An aliquot of catalyst slurry, prepared in (A) above, containing 0.025 millimole of titanium was added to a 1.8 liter stirred stainless steel reactor containing 1.0 liter of dry, oxygen-free hexane and 2.0 ml of 0.616 molar triisobutylaluminum. The molar ratio of Al:Ti was 49:1. The reactor nitrogen atmosphere was replaced with hydrogen by purging, the reactor contents were heated to 85° C., and the reactor pressure was adjusted to 70 psig (5 kg/cm$^2$) with hydrogen. Ethylene was then added to maintain a reactor pressure of 170 psig (12 kg/cm$^2$). After two hours at 85° C., the reactor contents were filtered and the polyethylene dried in a vacuum overnight at about 60° C. to yield 283 grams of polyethylene with a melt index of 0.7 and a bulk density of 19.3 lbs/ft$^3$ (0.31 g/cc). The catalyst efficiency was 236,000 grams of polyethylene per gram of titanium.

EXAMPLE 2

A. Catalyst Preparation

A solution of n-propylalcohol (37.6 ml, 500 millimoles) in hexane (100 ml) was added dropwise in ½ hour to a stirred solution of 532 ml of 0.470 molar dibutylmagnesium (250 millimoles). Hexane was added to the resultant slurry to give a total volume of 800 ml. A solution of $TiCl_4$ (55.0 ml, 500 millimoles) in hexane (200 ml) was added dropwise over a period of one hour. The slurry was diluted with hexane to 1200 ml and the hydrocarbon insoluble products allowed to settle. A portion of the supernatant liquid (600 ml) was removed by decantation. The solids were reslurried with fresh hexane (600 ml). The decantation was repeated two more times to remove hexane soluble reaction products. The hydrocarbon insoluble products were allowed to settle and the supernatant liquid was removed by decantation to obtain a slurry having a volume of 450. A portion (45 ml) of this slurry was removed and found by analysis to have a Mg:Ti molar ratio of 3.2:1. The remaining slurry (405 ml) was mixed with 49 ml $TiCl_4$ (446 millimoles). A diethylaluminum chloride solution (370 ml of 1.46 molar, 540 millimoles) was added dropwise to the stirred slurry. The hydrocarbon insoluble products were allowed to settle for about ½ hour and the supernatant liquid was removed by decantation. The solids were reslurried with fresh hexane. The decantation was repeated five more times to remove hexane soluble reaction products.

B. Polymerization of Ethylene

An aliquot of catalyst slurry, prepared in (A) above, containing 0.027 millimole of titanium was added to a 1.8 liter stirred stainless steel reactor containing 1.0 liter of dry, oxygen-free hexane and 0.88 ml of 0.616 molar triisobutylaluminum in hexane. The atomic ratio of Al:Ti was 20:1. The reactor nitrogen atmosphere was replaced with hydrogen by purging, the reactor contents were heated to 85° C., and the reactor pressure was adjusted to 90 psig (6 $kg/cm^2$) with hydrogen. Ethylene was then added to maintain a reactor pressure of 170 psig (12 $kg/cm^2$). After two hours at 85° C., the reactor contents were filtered and the polyethylene dried in a vacuum overnight at about 60° C. to yield 383 grams of polyethylene having a melt index of 2.7 and a bulk density of 15.4 $lbs/ft^3$ (0.25 g/cc). The catalyst efficiency was 295,000 grams of polyethylene per gram of titanium.

EXAMPLE 3

A. Catalyst Preparation

A 100 ml hexane solution containing 32.9 ml (438 millimoles) of n-propylalcohol was added dropwise to a stirred 350 ml hexane solution containing 210.8 ml (125 millimoles) of 0.593 molar dibutylmagnesium and 101.5 ml (62.5 millimoles) of 0.616 molar triisobutylaluminum. Successively, a 100 ml hexane solution containing 54.9 ml (500 millimoles) of $TiCl_4$ was added dropwise to the stirred magnesium alkyl-aluminum alkylalcohol mixture. The resulting solid was allowed to settle for 20 minutes and the supernatant was decanted. The solid was again slurried in fresh hexane, and the supernatant again decanted. Six additional decantations were made with fresh hexane. To the final stirred slurry was added 27.5 ml (250 millimoles) of $TiCl_4$, followed by the dropwise addition of a 250 ml hexane solution containing 171.2 ml (250 millimoles) of 1.46 molar diethylaluminum chloride. The resultant solid was allowed to settle for 20 minutes, and the supernatant was decanted. Seven additional decantations were made with fresh hexane. Analysis of the catalyst gave a Mg:Ti atomic ratio of 0.5:1.

B. Polymerization of Ethylene

Polymerization of ethylene was done in a stirred 1.0 liter stainless steel reactor containing 0.5 liter of dry, oxygen-free hexane. Triisobutylaluminum (0.81 ml of 0.616 molar; 0.50 millimoles) and then an aliquot of catalyst containing 0.01 millimoles of Ti, prepared in (A) above, were added to the reactor. The Al:Ti atomic ratio was 50:1. The reactor was pressured to about 50 psig (4 $kg/cm^2$) with hydrogen at room temperature and then vented to 5 psig (0.4 $kg/cm^2$). The pressure-venting with hydrogen was repeated 9 times. Then the reactor was heated to 85° C., and the reactor pressure adjusted to 60 psig (4 $kg/cm^2$) with hydrogen. Ethylene was introduced and the reactor pressure maintained at 170 psig (12 $kg/cm^2$) with ethylene. Polymerization was allowed to continue for two hours at 85° C., after which the reactor was cooled to room temperature. The reactor contents were filtered and the polyethylene dried in a vacuum overnight at about 60° C. The polyethylene obtained weighed 117 grams. The melt index of the polyethylene was 0.64 and the polymer had a bulk density of 18.0 $lbs/ft^3$ (0.29 g/cc). The catalyst efficiency was 244,000 grams of polyethylene per gram of titanium and 58,000 grams of polyethylene per gram of total catalyst calculated as indicated in footnote 8 of Table I.

EXAMPLE 4

A. Catalyst Preparation

A 100 ml hexane solution contining 37.6 ml of n-propylalcohol (500 millimoles) was added dropwise to a stirred 375 ml hexane solution containing 168.6 ml of 0.593 molar dibutylmagnesium (100 millimoles) and 162.3 ml of 0.616 molar trisobutylaluminum (100 millimoles). Successively, a 100 ml hexane solution containing 44.0 ml of $TiCl_4$ (400 millimoles) was added dropwise to the stirred magnesium alkyl-aluminum alkylalcohol mixture. The resulting solid was allowed to settle for 15 minutes and the supernatant was decanted. The solid was re-slurried in fresh hexane, and the supernatant again decanted. Six additional decantaions were made with fresh hexane. To the final stirred slurry was added 11.0 ml of $TiCl_4$ (100 millimoles) diluted to 25 ml with hexane, followed by dropwise addition of a 100 ml hexane solution containing 68.5 ml of 1.46 molar diethylaluminum chloride (100 millimoles). The resultant solid was allowed to settle for 20 minutes, and the supernatant was decanted. Seven additional decantations were made with fresh hexane. Analysis of the final catalyst gave a Mg:Ti atomic ratio of 1.0:1.

B. Polymerization of Ethylene

Following the procedure of Example 3(B), polymerization of ethylene was done using 1.60 ml of 0.616 molar triisobutyl-aluminum (0.986 millimoles) and an aliquot of catalyst, prepared in (A) above, containing 0.0048 millimoles of titanium. The reactor pressure was adjusted to 50 psig (4 $kg/cm^2$) with hydrogen instead of 60 psig (4 $kg/cm^2$). The polyethylene obtained weighed 134 grams, had a melt index of 0.36 and had a bulk density of 19.8 $lbs/ft^3$ (0.32 g/cc). The catalyst efficiency was 582,000 gm PE/gm Ti and 112,000 grams of polyethylene per gram of total catalyst calculated as described in footnote 8 of Table I.

EXAMPLE 5

A. Catalyst Preparation

A 100 ml hexane solution containing 39.0 ml of n-propylalcohol (519 millimoles) was added dropwise to a stirred 425 ml hexane solution containing 316.2 ml of 0.593 molar dibutylmagnesium (187.5 millimoles) and 75.0 ml of 0.616 molar triisobutylaluminum (46.2 millimoles). Successively, a 250 ml hexane solution containing 82.4 ml of $TiCl_4$ (750 millimoles) was added dropwise to the stirred magnesium alkyl-aluminum alkylalcohol mixture. The resulting hydrocarbon insoluble solid was allowed to settle for 20 mintues, followed by decantation of the supernatant. Seven additional decantations were made with fresh hexane. Then 81.4 ml $TiCl_4$ (750 millimoles) was added to the stirred slurry, followed by dropwise addition of a 600 ml hexane solution containing 513.7 ml of 1.46 molar diethylaluminum chloride (750 millimoles). The solid was allowed to settle for 30 mintues, followed by decantation of the supernatant. Seven additional decantations were made with fresh hexane. Analysis of the final catalyst gave a Mg:Ti atomic ratio of 0.25:1.0.

B. Polymerization of Ethylene

Following the procedure of example 3(B), ethylene polymerization was done using 3.20 ml of 0.616 molar triisobutylaluminum (1.97 millimoles) and an aliquot of catalyst, prepared in (A) above, containing 0.018 millimoles of titanium. The polyethylene collected weighed 104 grams, had a melt index of 0.10 and had a bulk density of 18.1 $lbs/ft^3$ (0.29 g/cc). The catalyst efficiency was 121,000 grams of polyethylene per gram of titanium and 32,000 grams of polyethylene per gram of total catalyst calculated as described in footnote 8 of Table I.

EXAMPLE 6

A. Catalyst Preparation

A 60 ml hexane solution containing 21.3 ml of n-propylalcohol (283 millimoles) was added dropwise to a stirred 200 ml hexane solution containing 126.5 ml of 0.593 molar dibutylmagnesium (75.0 millimoles) and 34.7 ml of 1.08 molar diethyl zinc (37.5 millimoles) solution in hexane. Successively, a 60 ml hexane solution containing 16.5 ml of $TiCl_4$ (150 millimoles) was added dropwise to the stirred magnesium alkyl-zinc alkyl-alcohol mixture. The resulting slurry was allowed to settle for 15 minutes, and the supernatant then decanted. Six additional decantations were made with fresh hexane. The solid was again slurried in hexane and 8.25 ml of $TiCl_4$ (75 millimoles) was added, followed by dropwise addition of a 150 ml hexane solution containing 51.4 ml of 1.46 molar diethylaluminum chloride (75.0 millimoles). The solid was allowed to settle for 15 mintutes and the supernatant was decanted. Seven additional decantations were made with fresh hexane. Analysis of the catalyst slurry gave a Mg:Ti atomic ratio of 1.0:1.0.

B. Polymerization of Ethylene

The procedure of example 3(B) was followed except the hydrogen pressure was adjusted to 40 psig and 0.80 ml of 0.616 molar triisobutylaluminum (0.493 millimoles), 0.93 ml of 1.08 molar diethyl zinc (1.00 millimole) in hexane, and an aliquot of catalyst prepared in (A) above containing 0.015 millimoles of titanium was added to the reactor to catalyze the polymerization reaction. The polyethylene obtained weighed 228 grams, had a melt index of 0.99 and had a bulk density of 18.1 $lbs/ft^3$ (0.29 g/cc). The catalyst efficiency was 317,000 grams of polyethylene per gram of titanium and 61,000 grams of polyethylene per gram of total catalyst calculated as described in footnote 8 of Table I.

EXAMPLE 7

A. Catalyst Preparation

A solution of n-propyl alcohol and water (35.0 ml; 375 millimoles water and 375 millimoles of n-propylalcohol) was added dropwise to a stirred solution of 406 ml of 0.616 molar triisobutylaluminum (250 millimoles) and 210 ml of 0.595 molar dihexylmagnesium (125 millimoles). To the resultant stirred solution was added dropwise a solution of 13.7 ml titanium tetrachloride (125 millimoles) dissolved in 200 ml hexane. The resultant slurry was diluted to 800 ml with hexane. A portion of the slurry (400 ml) was stirred while 64.2 ml of 1.46 molar diethylaluminum chloride (94 millimoles) was added dropwise over a period of about 1 hour. The hydrocarbon insoluble solids were allowed to settle for 20 mintues, and the supernatant liquid decanted. Fresh hexane was added to a volume of 400 ml and the decantation procedure repeated 4 more times to remove the hydrocarbon soluble products.

B. Polymerization of Ethylene

The procedure of example 1(B) was used with 2.4 ml of 0.616 molar triisobutylaluminum and an aliquot of catalyst prepared in (A) above containing 0.030 millimoles of titanium. The Al:Ti atomic ratio was 50:1. The reactor pressure was adjusted to 60 psig (4 $kg/cm^2$) with hydrogen before adding ethylene. The polyethylene obtained weighed 183 grams, had a melt index of 0.15, and had a bulk density of 15.5 $lbs/ft^3$ (0.25 g/cc). The catalyst efficiency was 127,000 grams of polyethylene per gram of titanium.

EXAMPLES 8–14

A. Catalyst Preparation:

Using the quantities given in Table I, a mixture of an oxygen- or nitrogen-containing compound and hexane was added dropwise to a stirred dialkylmagnesium solution. A solution of titanium tetrachloride in hexane was then added dropwise to the resultant slurry. An aluminum alkyl reducing agent was then added dropwise to the stirred slurry. The hydrocarbon insoluble products were allowed to settle and the supernatant solution was removed by decantation. The solids were reslurried with fresh hexane. The decantation procedure was repeated five more times to remove the hydrocarbon soluble reaction products.

B. Polymerization of Ethylene:

Using the amounts given in Table I, an aliquot of the catalyst prepared in (A) above was added to a 1.8 liter stirred, stainless steel reactor containing 1.0 liter of dry, oxygen-free hexane and the amount of triisobutylaluminum given in Table I. The reactor nitrogen was replaced with hydrogen by purging, the reactor contents were heated to 85° C., and the reactor pressure was adjusted to 70 psig (5 $kg/cm^2$) with hydrogen. Ethylene was then added to maintain a reactor pressure of 170 psig (12 $kg/cm^2$). After two hours at 85° C., the reactor contents were filtered and the polyethylene dried in a vacuum overnight at about 60° C. The results are listed in Table I.

TABLE I

(CATALYST PREPARATION)

| EXAMPLE NUMBER | MAGNESIUM COMPOUND Ml. of Mg Cmpd. | Milli- moles Mg | OXYGEN OR NITROGEN CONTAINING COMPOUND Compound | ml.[1] | Milli- moles | ONE MOLAR TiCl$_4$ ml. | MILLI- MOLES OF TiCl$_4$ | REDUCING AGENT ml. | milli- moles |
|---|---|---|---|---|---|---|---|---|---|
| 8  | 84.3[2] | 50 | Isopropanol          | 7.7  | 100 | 25    | 25    | 34.2[3] | 50  |
| 9  | 84.3[2] | 50 | Acetyl Chloride      | 7.1  | 100 | 25    | 25    | 17.1[3] | 25  |
| 10 | 84.3[2] | 50 | Acetic Anhydride     | 7.4  | 100 | 100   | 100   | 68.5[3] | 100 |
| 11 | 84.3[2] | 50 | 2,2-dimethoxypropane | 12.3 | 100 | 100   | 100   | 68.5[3] | 100 |
| 12 | 84.0[4] | 50 | Acetone              | 7.4  | 100 | 33.3  | 33.3  | 22.8[3] | 33.3 |
| 13 | 33.6[4] | 20 | Propionaldehyde      | 2.9  | 40  | 200   | 200   | 325[5]  | 200 |
| 14 | 78.5[6] | 50 | Isopropylamine       | 8.6  | 100 | 100   | 100   | 68.5[3] | 100 |

(POLYMERIZATION)

| EXAMPLE NUMBER | MILLI- MOLES Ti | TIBA[5] ml. | ATOMIC RATIO Al:Ti | POLY- ETHYLENE RECOVERED | EFFICIENCY kPE[7] g Ti | kPE[8] g TC | MELT INDEX I$_2$ | BULK DENSITY lbs/ft$^3$ | g/cc |
|---|---|---|---|---|---|---|---|---|---|
| 8  | 0.02  | 1.6 | 50:1  | 320 | 334 | 46 | 1.6  | 22.3 | 0.36 |
| 9  | 0.015 | 2.4 | 100:1 | 326 | 454 | 63 | 1.8  | 18.2 | 0.29 |
| 10 | 0.03  | 4.9 | 100:1 | 177 | 123 | 29 | 0.57 | 20.4 | 0.33 |
| 11 | 0.05  | 8.1 | 100:1 | 154 | 64  | 15 | 0.54 | 13.6 | 0.22 |
| 12 | 0.02  | 3.2 | 100:1 | 105 | 109 | 18 | 1.6  | 14.0 | 0.22 |
| 13 | 0.017 | 2.8 | 100:1 | 47  | 56  | 17 | 0.05 | 10.9 | 0.17 |
| 14 | 0.02  | 3.2 | 100:1 | 143 | 149 | 35 | 0.20 | 15.3 | 0.25 |

FOOTNOTES TO TABLE I
[1] Added as mixture with 100 ml of hexane.
[2] 0.593 molar dibutyl magnesium in a hexane-heptane mixture.
[3] 1.46 molar diethylaluminum chloride in hexane.
[4] 0.595 molar dihexylmagnesium in heptane.
[5] 0.616 molar triisobutylaluminum in hexane.
[6] 0.637 molar butylethylmagnesium in heptane.
[7] 1000 grams of polyethylene per gram of titanium.
[8] 1000 grams of polyethylene per gram of total catalyst calculated from Mg:Ti ratio assuming a mixture of MgCl$_2$ and TiCl$_3$.

EXAMPLE 15

A. Catalyst Preparation:

In an inert atmosphere at room temperature, a 100 ml hexane solution containing 3.55 gm (50 millimoles) of ethyl isocyanate was added dropwise to a stirred 200 ml hexane solution of 42.2 ml of 0.593 molar dibutylmagnesium (25 millimoles). Successively, a 200 ml hexane solution containing 32.7 ml (50 millimoles) of 1.53 molar diethylaluminum chloride in hexane was added dropwise to the stirring magnesium alkyl-ethyl isocyanate reaction mixture. The resultant slurry was allowed to settle, the supernatant decanted, and the remaining solid was slurried in fresh hexane. One additional decantation was made with fresh hexane. A 50 ml hexane solution of 5.50 ml (50 millimoles) of TiCl$_4$ was added dropwise to the stirring hexane slurry of the solid made above. The resultant solid was allowed to settle, the supernatant was decanted, and the solid re-slurried in fresh hexane. Seven additional decantations were made with fresh hexane. Analysis of the final catalyst gave a Mg:Ti atomic ratio of 4.3:1.

B. Polymerization of Ethylene:

The polymerization procedure of example 3(B) was repeated using 1.6 ml of 0.616 molar triisobutylaluminum (1.0 millimoles) and an aliquot of catalyst prepared in (A) above containing 0.010 millimoles of titanium. The polyethylene obtained weighed 232 grams, had a melt index of 2.57 and had a bulk density of 16.1 lbs/ft$^3$ (0.26 g/cc). The catalyst efficiency was 480,000 grams of polyethylene per gram of titanium and 41,000 grams of polyethylene per gram of total catalyst calculated as described in footnote 8 of Table I.

EXAMPLE 16

A. Catalyst Preparation:

In an inert atmosphere at room temperature, a 100 ml hexane solution containing 15.0 (200 millimoles) of n-propylalcohol was added dropwise to a stirred 200 ml hexane solution of 169 ml of 0.593 molar dibutylmagnesium (100 millimoles). Successively, a 125 ml solution containing 23.3 ml (261 millimoles) of phosphorus trichloride was added dropwise, and the reaction mixture stirred for 30 minutes. The slurry was allowed to stir for 15 minutes, the supernatant decated, and the solid was slurried in fresh hexane. Five additional decantations were made with fresh hexane. A 200 ml hexane solution containing 22.0 cc (200 millimoles) of TiCl$_4$ was added dropwise to the stirring hexane slurry of the solid made above. Successively, a 200 ml hexane solution containing 137.0 ml (200 millimoles) of 1.46 molar diethylaluminum chloride was added dropwise. The resultant slurry was allowed to stir for 20 minutes, the supernatant was decanted, and the remaining solid was slurried in fresh hexane. Seven additional decantations were made with fresh hexane. The final solid was slurried in fresh hexane and stored in a capped bottle. Analysis of the catalyst gave a Mg:Ti atomic ratio of 0.21:1.

B. Polymerization of Ethylene:

The polymerization procedure of example 3(B) was repeated using 2.8 ml of 0.616 molar triisobutylaluminum (1.75 millimoles) and an aliquot of catalyst prepared in (A) above containing 0.0175 millimoles of titanium. The polyethylene obtained weighed 131 grams, had a melt index of 2.61 and had a bulk density of 15.4 lbs/ft$^3$ (0.25 g/cc). The catalyst efficiency was 156,000 grams of polyethylene per gram of titanium and 43,000 grams of polyethylene per gram of total catalyst calculated as described in footnote 8 in Table I.

EXAMPLE 17

A. Catalyst Preparation:

In an inert atmosphere at room temperature, 23.20 gm (200 millimoles) of dimethylglyoxime were slurried in 300 ml hexane. A hexane solution of 100 millimoles dibutylmagnesium was added dropwise to the stirred dimethylglyoxime-hexane slurry. A 200 ml hexane solution containing 230.7 ml (200 millimoles) of 1.53 molar ethylaluminum dichloride was then added dropwise to the magnesium alkyl-dimethylglyoxime mixture. The resultant slurry was allowed to sit for 30 minutes, the supernatant decanted, and the remaining solid was slurried in fresh hexane. Five additional decantations were made with fresh hexane. A 100 ml hexane solution of 22.0 cc (200 millimoles) of TiCl$_4$ was added dropwise to the solid previously made above, and that was followed by the dropwise addition of a 100 ml hexane solution containing 137.0 ml (200 millimoles) of 1.46 molar diethylaluminum chloride. Successively, the resultant solid was allowed to settle, the supernatant was decanted, and the solid re-slurried in fresh hexane. Seven additional decantations were made with fresh hexane.

B. Polymerization of Ethylene:

The polymerization procedure of example 3(B) was repeated using 2.4 ml of 0.616 molar triisobutylaluminum (1.50 millimoles) and an aliquot of catalyst prepared in (A) above containing 0.030 millimoles of titanium. The polyethylene obtained weighed 115 grams, had a melt index of 0.19 and had a bulk density of 12.8 lbs/ft$^3$ (0.21 g/cc). The catalyst efficiency was 80,000 grams of polyethylene per gram of titanium.

EXAMPLE 18

A. Catalyst Preparation:

To a stirring solution of 101 ml of 0.593 molar dibutylmagnesium (60 millimoles) and 200 ml hexane was added isobutyronitrile (120 millimoles) in hexane solution (50 ml hexane). The addition was made dropwise over 30 minutes and yielded a cream-colored solid. The solid was slurried in the hexane and TiCl$_4$ (120 millimoles) in 70 ml. of hexane was added dropwise over 20 minutes. The resultant solid was washed and decanted several times and then re-slurried in 300 ml of hexane. To this mixture was added diethylaluminum chloride (130 millimoles) in hexane solution. This addition was controlled to maintain a temperature below 40° C. The resultant brown solid was decanted as in example 1(A) to remove the hexane soluble materials.

B. Polymerization of Ethylene:

An aliquot of catalyst slurry prepared in (A) above containing 0.050 millimole of titanium was added to a 1.8 liter stirred stainless steel reactor containing 1.0 liter of dry, oxygen-free hexane and 3.9 milliliters of 0.616 molar triisobutylaluminum (2.40 millimoles). The reactor nitrogen atmosphere was replaced with hydrogen by purging, the reactor contents were heated to 85° C., and the reactor pressure was adjusted to 50 psig (3.52 kg/cm$^2$) with hydrogen. Ethylene was then added to maintain a reactor pressure of 170 psig. After two hours at 85° C., the reactor contents were filtered and the polyethylene dried in a vacuum overnight at about 60° C. to yield 74 grams of polyethylene with a melt index of 0.01. The catalyst efficiency was 31,000 grams of polyethylene per gram of titanium.

EXAMPLE 19

A. Catalyst Preparation:

To a 1-liter round bottom flask fitted with a nitrogen inlet, magnetic stirring bar and a fritted glass dip tube was added 143 ml of 0.593 molar dibutylmagnesium (85 millimoles) and 500 ml hexane. As the solution was stirred ammonia gas was bubbled through the liquid and an exothermic reaction began which caused the formation of a white precipitate. When no further exotherm could be detected the mixture was stirred an additional 30 minutes allowing the contents to cool to ambient temperature. The white solid was suspended with stirring and TiCl$_4$ (290 millimoles) dissolved in 50 cc of hexane was added dropwise over 20 minutes. An immediate reaction took place wherein the white solid was converted to a yellow solid. This material was washed and decanted several times to remove all hexane soluble compounds. The solid was slurried in 300 ml of hexane and TiCl$_4$ (60 millimoles) was added in a single portion. To this mixture was added, over a 30-minute period, diethylaluminum chloride (120 millimoles) dissolved in 100 cc of hexane. The resultant brown solid was washed and decanted several times to remove the hydrocarbon soluble products.

B. Polymerization of Ethylene:

The polymerization procedure of example 18(B) was repeated using 1.46 ml of 0.616 molar triisobutylaluminum (0.90 millimole) and an aliquot of catalyst prepared in (A) above containing 0.030 millimole of titanium. The polyethylene obtained weighed 150 grams and had a melt index of 0.4. The catalyst efficiency was 104,000 grams of polyethylene per gram of titanium.

EXAMPLE 20

A. Catalyst Preparation:

To a 1-liter round bottom flask fitted with a nitrogen inlet, magnetic stirring bar and a fritted glass dip tube was added 50.6 ml of 0.593 molar dibutylmagnesium (30 millimoles) and 350 ml of dry hexane. The flask was eqipped to maintain a nitrogen atmosphere over the liquid. As the solution was stirred ammonia gas was bubbled through the liquid and an exothermic reaction began which caused the formation of a white precipitate. When no further exotherm was detected the mixture was stirred an additional 30 minutes while purging with dry nitrogen through the dip tube. The resultant white solid was suspended with stirring while SiCl$_4$ (30 millimoles) dissolved in 50 cc of hexane was added dropwise. After the addition was complete, the solution was stirred for an additional 15 minutes. The white solid was washed and decanted several times to remove all hexane soluble material. The solid was slurried in in 300 cc of dry hexane and a single portion of TiCl$_4$ (30 millimoles) was added. To this stirring mixture was added diethylaluminum chloride (35 millimoles) in 100 cc of hexane, dropwise, over a 20-minute period while maintaining a temperature below 40° C. The resultant solid was washed and decanted several times to remove the hexane soluble products.

B. Polymerization of Ethylene:

The polymerization procedure of example 18(B) was repeated using 1.22 ml of 0.616 molar triisobutylaluminum (0.75 millimole) and an aliquot of catalyst prepared in (A) above containing 0.015 millimole of titanium. The polyethylene obtained weighed 115 grams and had a melt index of 0.15. The catalyst efficiency was 160,000 grams of polyethylene per gram of titanium.

EXAMPLE 21

A. Catalyst Preparation

To a stirring solution of 191 ml of 0.593 molar dibutylmagnesium (113 millimoles) and 500 ml of hexane was added acetic acid (226 millimoles) dissolved in 200 ml of hexane. The addition was carried out dropwise over a 30-minute period with agitation. This yielded a white precipitate which was then treated with a TiCl$_4$ (113 millimoles) and hexane (100 ml) solution. This addition was again made dropwise over 30 minutes and gave a yellow colored solid product. It was washed and decanted several times to remove the hexane soluble products. The hydrocarbon insoluble product was slurried in 400 ml of hexane and TiCl$_4$ (113 millimoles) added. To this stirred slurry was added dropwise over a 45 minute period a solution of diethylaluminum chloride (250 millimoles) in 300 ml of hexane. The resultant solid was allowed to settle and the supernatant liquid removed by decantation. Fresh hexane was added while stirring. The decantation procedure was then repeated 5 more times to remove the hydrocarbon soluble products.

B. Polymerization of Ethylene:

The polymerization procedure of example 18(B) was repeated using 0.97 ml of 0.616 molar triisobutylaluminum (0.60 millimole) and an aliquot of catalyst prepared in (A) above containing 0.020 millimoles of titanium. The polyethylene obtained weighed 203 grams. The catalyst efficiency was 212,000 grams of polyethylene per gram of titanium.

EXAMPLE 22

A. Catalyst Preparation

A solution of 13.2 ml n-propylalcohol (275 millimoles) in 100 ml of hexane was added dropwise to a stirred solution of 84.3 ml of 0.593 molar dibutylmagnesium (50 millimoles) and 40.6 ml of 0.616 molar triisobutylaluminum (25 millimoles). To the resultant stirred solution was added dropwise a solution of 5.8 ml silicon tetrachloride (50 millimoles) in 100 ml of hexane. The hydrocarbon insoluble products were allowed to settle and the supernatant solution was removed by decantation. The solids were re-slurried with fresh hexane. The decantation procedure was then repeated 2 more times to remove the hydrocarbon soluble reaction products. Hexane was added to a volume of about 300 ml and the slurry was mixed with 200 ml of 1.0 molar titanium tetrachloride (200 millimoles) in hexane. To the stirred mixture was added dropwise 137.0 ml of 1.47 molar diethylaluminum chloride (200 millimoles). The hydrocarbon insoluble products were allowed to settle and the supernatant solution was removed by decantation. The solids were reslurried with fresh hexane. The decantation procedure was repeated five more times to remove the hexane soluble reaction products.

B. Polymerization of Ethylene:

The polymerization procedure of example 8(B) was repeated using 3.2 ml of 0.616 molar triisobutylaluminum (2.0 millimoles) and an aliquot of catalyst prepared in (A) above containing 0.020 millimoles of titanium. The polyethylene obtained weight 183 grams and had a melt index of 0.20. The catalyst efficiency was 191,000 grams of polyethylene per gram of titanium.

EXAMPLE 23

A. Catalyst Preparation

A solution of 7.9 ml methyl acetate (100 millimoles) in 100 ml of hexane was added dropwise to a stirred solution of 84.3 ml (50 millimoles) of 0.593 molar dibutylmagnesium. Silicon tetrachloride (23.0 ml, 200 millimoles) in hexane (100 ml) was added dropwise and the hydrocarbon insoluble solids allowed to settle. The supernatant solution was removed by decantation and fresh hexane added. The decantation procedure was then repeated 3 more times to remove the hydrocarbon soluble reaction products. Titanium tetrachloride (100 ml of 1.0 molar in hexane, 100 millimoles) was added. A 1.46 molar diethylaluminum chloride solution (68 ml, 100 millimoles) was added dropwise to the stirred slurry..The solids were allowed to settle and the supernatant liquid removed by decantation. Fresh hexane was added and the decantation procedure was repeated five more times to remove the hexane soluble species.

B. Polymerization of Ethylene:

The polymerization procedure of example 8(B) was repeated using 5.7 ml of 0.616 molar triisobutylaluminum (3.5 millimoles) and an aliquot of catalyst prepared in (A) above containing 0.035 millimoles of titanium. The polyethylene obtained weighed 219 grams, had a melt index of 1.37 and had a bulk density of 15.5 lbs./ft$^3$ (0.248 g/cc). The catalyst efficiency was 131,000 grams of polyethylene per gram of titanium.

EXAMPLE 24

A. Catalyst Preparation:

A solution of 12.0 ml diethylcarbonate (100 millimoles) in 100 ml of hexane was added dropwise to a stirred solution of 84.3 ml of 0.593 molar dibutylmagnesium (50 millimoles). A hexane solution of ethylaluminum dichloride (49.0 ml of 1.53 molar, 75 millimoles) was added dropwise to the stirred mixture of dibutylmagnesium and diethylcarbonate. The solids were allowed to settle and the supernatant liquid was decanted. Fresh hexane was added and the decantation repeated until a total of 3 decants had been made. A titanium tetrachloride solution (25.0 ml of 1.0 molar, 25 millimoles) in hexane was added along with hexane to give a total volume of about 250 ml. The mixture was stirred while 17.1 ml of 1.46 molar diethylaluminum chloride solution (25 ml, 100 millimoles) was added dropwise. The solids were allowed to settle and the supernatant liquid removed by decantation. Fresh hexane was added and the decantation repeated a total of six times to remove the hexane soluble species.

B. Polymerization of Ethylene:

The polymerization procedure of example 8(B) was repeated using 5.2 ml of 0.616 molar triisobutylaluminum (3.2 millimoles) and an aliquot of catalyst prepared in (A) above containing 0.035 millimoles of titanium. The polyethylene obtained weighed 264 grams, had a melt index of 2.44 and had a bulk density of 10.3 lbs/ft$^3$ (0.17 g/cc). The catalyst efficiency was 172,000 grams of polyethylene per gram of titanium.

EXAMPLE 25

A. Catalyst Preparation:

Succinimide (4.95 grams, 50 millimoles) was slowly added to a stirred solution of 42.2 ml (25 millimoles) of 0.593 molar dibutylmagnesium. After two hours of continuous stirring, 32.7 ml of 1.53 molar ethylaluminum dichloride (50 millimoles) in hexane was added dropwise. The solids were allowed to settle and the supernatant liquid was removed by decantation. Fresh hexane was added to the slurry and the decantation repeated until a total of 3 decants had been made. Fresh hexane was added to give a total volume of about 75 ml. Then 100 ml of 1.0 molar titanium tetrachloride (100 millimoles) was added to the stirred mixture, followed by the dropwise addition of 68.5 ml of 1.46 molar diethylaluminum chloride (200 millimoles). The previous decantation procedure was repeated six times to remove the hydrocarbon soluble species.

B. Polymerization of Ethylene:

The polymerization procedure of example 3(B) was repeated using 70 psig (4.92 kg/cm$^2$) hydrogen, 3.2 ml of 0.616 molar triisobutylaluminum (2.0 millimoles) and an aliquot of catalyst prepared in (A) above containing 0.020 millimoles of titanium. The polyethylene obtained weighed 181 grams, had a melt index of 1.78 and had a bulk density of 10.6 lbs/ft$^3$ (0.17 g/cc). The catalyst efficiency was 147,000 grams of polyethylene per gram of titanium.

EXAMPLE 26

A. Catalyst Preparation

A solution of 8.6 ml isopropylamine (100 millimoles) in 100 ml of hexane was added dropwise to a stirred solution of 84.3 ml of 0.593 molar dibutylmagnesium (50 millimoles). A hexane solution of ethylaluminum dichloride (49.0 ml of 1.53 molar, 75 millimoles) was added dropwise to the stirred mixture of dibutylmagnesium and isopropylamine. The solids were allowed to settle and the supernatant liquid was decanted. Fresh hexane was added and the decantation procedure repeated until a total of 4 decants had been made. A titanium tetrachloride (100 ml of 1.0 molar, 100 millimoles) in hexane was added along with hexane to give a total volume of about 300 ml. The mixture was stirred while 68.5 ml of 1.46 molar diethylaluminum hloride (100 millimoles) was added dropwise. The solids were allowed to settle and the supernatant liquid removed by decantaion. Fresh hexane was added and the decantation repeated a total of six times to remove the hexane soluble species.

B. Polymerization of Ethylene:

The polymerization procedure of example 8(B) was repeated using 4.2 ml of 0.616 molar triisobutylaluminum (2.6 millimoles) and an aliquot of catalyst prepared in (A) above containing 0.026 millimole of titanium. The polyethylene obtained weighed 181 grams, had a melt index of 0.12. The catalyst efficiency was 145,000 grams of polyethylene per gram of titanium.

EXAMPLE 27

A. Catalyst Preparation:

A mixture of 169 ml of 0.593 molar dibutylmagnesium (100 millimoles) and 325 ml of 0.616 molar triisobutylaluminum (200 millimoles) were added to a one-liter stainless steel stirred reactor. Carbon dioxide was added to the reactor to give a pressure of 30 psig. The reaction exotherm heated the reactor to 50°–60° C. After two hours the reactor had cooled to ambient temperature. The carbon dioxide atmosphere in the reactor was replaced with nitrogen by purging and the reactor was taken into a gloved box. The reactor contents was made up to 500 ml with hexane to give a mixture which was 0.20 molar in magnesium. 250 ml of the above 0.20 molar magnesium mixture (50 millimoles magnesium) was placed in a stirred glass container. Ethylaluminum dichloride (49.0 ml of 1.53 molar, 75 millimoles) was added dropwise. The solids were allowed to settle and the supernatant liquid removed by decantation. Fresh hexane was added and the decantation procedure repeated until a total of 3 decants had been made. A titanium tetrachloride (100 ml of 1.0 molar, 100 millimoles) in hexane was added along with hexane to give a total volume of about 400 ml. The mixture was stirred while 68.5 ml of 1.46 molar diethylaluminum chloride (100 millimoles) was added dropwise. The solids were allowed to settle and the supernatant liquid removed by decantaion. Fresh hexane was added and the decantation repeated a total of six times to remove the hexane soluble species.

B. Polymerization of Ethylene:

The polymerization procedure of example 8(B) was repeated using 4.1 ml of 0.616 molar triisobutylaluminum (2.5 millimoles) and an aliquot of catalyst prepared in (A) above containing 0.025 millimole of titanium. The polyethylene obtained weighed 126 grams, had a melt index of 0.40 and had a bulk density of 15.1 lbs/ft$^3$ (0.24 g/cc). The catalyst efficiency was 105,000 grams of polyethylene per gram of titanium.

EXAMPLE 28

A. Catalyst Preparation

In an inert atmosphere at room temperature, a 100 ml hexane solution containing 350 millimoles of a n-propyl alcohol was added dropwise to a stirred 500 ml hexane solution containing 168.6 ml of 0.593 molar dibutyl magnesium (100 millimoles) and 81.2 ml of 0.616 molar tri-isobutylaluminum (50 millimoles). Successively, a 100 ml hexane solution containing 22.0 ml of 9.1 molar $TiCl_4$ (200 millimoles) was added dropwise. The resultant solid was allowed to settle for 15 minutes and the supernatant was decanted off. The solid was re-slurried in fresh hexane and the supernatant was decanted again. Six additional decantations were made with fresh hexane. The slurry was divided into two equal portions by volume, and one portion was discarded. To the other portion was added 11.0 ml of 9.1 molar $TiCl_4$ (100 millimoles), followed by the dropwise addition of a 200 ml hexane solution containing 74.8 ml of 1.47 molar diethylaluminum chloride (110 millimoles). The final solid was allowed to settle for 10 minutes, then the supernatant was decanted. The solid was re-slurried in fresh hexane and the supernatant again decanted. Six additional decantations were made with fresh hexane. The washed solid was then used as a polymerization catalyst in examples B and C below.

B Copolymerization of Ethylene and 1-octene:

To a stirred 1.0 liter reactor containing 375 ml of dry, oxygen-free hexane were added 1.6 ml of 0.616 molar triisobutylaluminum (0.986 millimole) and an aliquot of catalyst prepared in (A) above containing 0.0195 millimoles of titanium. After the pressure vent procedure of example 3(B) was employed, the reactor was pressured to 15 psig with hydrogen and the reactor temperature was adjusted to 75° C. Then 1-octene was introduced into the reactor by sweeping ethylene at 170 psig through a sidestream cylinder containing 125 ml of 1-octene. Reactor pressure was then maintained at 170 psig with ethylene. The polymer obtained weighed 136 grams. The melt index of the polymer was 0.27 and the density, measured according to ASTM-D792-66, was 0.9444 gram per cm$^3$. The catalyst efficiency was 145,000 grams of polymer per gram titanium and 35,000 grams of polymer per gram of total catalyst as calculated from the Mg:Ti ratio assuming a mixture of $MgCl_2$ and $TiCl_3$.

C. Copolymerization of Ethylene and 1-butene:

The procedure of (B) above was followed except the reactor was pressured to 10 psig with hydrogen and 1.6 ml of 0.616 molar triisobutylaluminum (0.986 millimole) and an aliquot of catalyst prepared in (A) above containing 0.200 millimole of titanium was added to the reactor to catalyze the polymerization reaction. The 1-butene was introduced into the reactor by sweeping ethylene gas at 170 psig through a sidestream cylinder containing 16.0 grams of 1-butene. Reactor pressure was maintained at 170 psig with ethylene. The polymer obtained weighed 158 grams, had a melt index of 0.15 by adding hydrogen. Ethylene was introduced and the reactor pressure maintained at 170 psig (12 kg/cm$^2$) with ethylene. The polymerization was allowed to continue for two hours at 85° C., after which the reactor was cooled to room temperature. The reactor contents were filtered and the polyethylene dried in a vacuum overnight at about 60° C. The polyethylene obtained weighed 219 grams, had a melt index of 0.35, and a bulk density of 24.0 lbs/ft$^3$ (0.39 g/cc). The catalyst efficiency was 305,000 grams of polyethylene per gram of titanium.

EXAMPLE 32

A. Catalyst Preparation:

A solution of 5.9 grams nickel dichloride hexahydrate (25 millimoles) dissolved in 39.1 ml of n-propylalcohol (520 millimoles) was added dropwise to 526 ml of a stirred solution of 0.475 molar dibutylmagnesium (250 millimoles). A solution of 55 ml titanium tetrachloride in 100 ml of hexane was added dropwise to the resultant slurry. The solids were allowed to settle and the supernatant liquid removed by decantation. Fresh hexane was added and the decantation procedure was repeated five more times to remove the hexane soluble species. Titanium tetrachloride (55 ml, 500 millimoles) was added to the stirred hexane slurry and then 342 ml of a 1.46 molar diethylaluminum chloride solution was added dropwise. The solids were allowed to settle and the supernatant liquid removed by decantation. Fresh hexane was added and the decantation procedure was repeated five more times to remove the hexane soluble species.

B. Polymerization of Ethylene:

The procedure of Example 31(B) was repeated using 1.0 ml of 0.616 molar triisobutylaluminum (0.62 millimole) and an aliquot of catalyst prepared in (A) above containing 0.0312 millimoles of titanium. The polyethylene obtained weighed 227 grams, had a melt index of 0.08, and a bulk density of 19.0 lbs/ft$^3$ (0.32 g/cc). The catalyst efficiency was 152,000 grams of polyethylene per gram of titanium.

We claim:

1. A catalyst support which is the solid reaction product formed by reacting in an inert diluent
    (A) the reaction product of
        (1) an organomagnesium component or a mixture or complex thereof represented by the formula MgR$_2$.xMeR'$_{x'}$ wherein each R is independently a hydrocarbyl group having from 1 to about 20 carbon atoms, each R' is independently hydrogen, a hydrocarbyl or a hydrocarbyloxy group having from 1 to about 20 carbon atoms, Me is Zn, Al or B, x has a value of from zero to about 10, x' has a value equal to the valence of Me and
        (2) an oxygen-containing compound, a nitrogen-containing compound or mixture of such compounds in a quantity sufficient to lower the amount of hydrocarbyl groups present in component (1-a) such that the resultant product does not substantially reduce TiCl$_4$ at 25° C.; and
    (B) a transition metal-free halide source employed in a quantity so as to convert essentially all of the groups attached to a magnesium atom in component (A) to a halide group.

2. The support of claim 1 wherein said halide source is a compound or mixture of compounds represented by the formulas AlR$_{3-a}$X$_a$, SiR$_{4-b}$X$_b$, SnR$_{4-b}$X$_b$, POX$_3$, PX$_3$, PX$_5$, SO$_2$X$_2$, GeX$_4$, R$^4$(CO)X, and R$^4$X; each X is independently chlorine or bromine, each R is independently hydrogen, a hydrocarbyl or a hydrocarbyloxy group having from 1 to about 10 carbon atoms; each R$^4$ is independently hydrogen or a hydrocarbyl group having from 1 to about 10 carbon atoms; a has a value from 1 to 3; b has a value from 1 to 4; and wherein said inert diluent is a hydrocarbon or mixture of hydrocarbons having from 5 to about 20 carbon atoms.

3. The support of claim 2 wherein the value of x and each R and R' is such that the magnesium compound is soluble in said hydrocarbon or mixture of hydrocarbons.

4. The support of claim 3 wherein X is chlorine the value of x and each R and R' is such that the reaction product (A) is soluble in said inert diluent.

5. The support of claim 4 wherein said magnesium component is dibutylmagnesium, butylethylmagnesium, dihexylmagnesium, butyloctylmagnesium, complexes or mixtures of said magnesium compounds with diethylzinc or triisobutylaluminum or mixture thereof in any combination.

6. The support of claims 1, 2, 3, 4, or 5 wherein component (A-2) is water, carbon monoxide, sulfur dioxide, an organic oxygen-containing compound selected from, acetals, ketals, esters of carboxylic acids, orthoesters of carboxylic acids, halides of carboxylic acids, carboxylic acid anhydrides, carbonates, glycols or mixture thereof in any combination.

7. The support of claims 1, 2, 3, 4, or 5 wherein component (A-2) is carbon dioxide, an organic oxygencontaining compound selected from alcohols, aldehydes, ketones and carboxylic acids or mixture thereof in any combination.

8. The support of claim 7 wherein component (A-2) is an alcohol or mixture of two or more alcohols having from 1 to about 20 carbon atoms.

9. The support of claim 8 wherein said alcohol is methyl alcohol, ethyl alcohol, n-propyl alcohol, isopropyl alcohol, n-butyl alcohol, sec-butyl alcohol, tert-butyl alcohol, octadecyl alcohol, phenol, 2,6-di-tert-butyl-4-methylphenol, or mixture thereof in any combination.

10. The support of claim 9 wherein said alcohol is methyl alcohol, ethyl alcohol, n-propyl alcohol, isopropyl alcohol or n-butyl alcohol.

11. The support of claims 1, 2, 3, 4 or 5 wherein component (A-2) is ammonia, an amine, a nitrile, an amide, an oxime, an imide, an isocyanate or a mixture thereof in any combination.

12. The support of claim 11 wherein component (A-2) is ammonia or an amine.

13. A catalyst which is the inert diluent washed hydrocarbon insoluble product resulting from the admixture of:
    (1) the reaction product of
        (A) the reaction product of
            (1) an organomagnesium component or a mixture or complex thereof such components represented by the formula MgR$_2$.xMeR'$_{x'}$, wherein each R is independently a hydrocarbyl group having from 1 to about 20 carbon atoms, each R' is independently hydrogen, a hydrocarbyl or hydrocarbyloxy group having from 1 to about 20 carbon atoms Me is Al, Zn or B, x has a value of from zero to 10 and X' has a value equal to the valence of Me; and
            (2) (a) an oxygen-containing compound, a nitrogen-containing compound or mixture of such and had a density, measured according to ASTM-D792-66, of 0.9304 gram per cm$^3$. Catalyst efficiency was 165,000 grams polymer per gram titanium and 39,000 grams polymer per gram of total catalyst as calculated from the Mg:Ti ratio assuming a mixture of MgCl$_2$ and TiCl$_3$.

EXAMPLE 29

A. Catalyst Preparation:

A solution of 30.1 ml n-propylalcohol (400 millimoles) and 100 ml hexane was added dropwise to a stirred solution of 157 ml of 0.637 molar butylethylmagnesium (100 millimoles) in heptane and 81 ml of 0.616 molar triisobutylaluminum (50 millimoles) hexane. The resultant solution was cooled to 30° C., and a solution of 44.0 ml titanium tetrachloride (400 millimoles) in 200 ml of hexane was added dropwise with continuous stirring. The slurry was stirred for one-half hour, the hydrocarbon insoluble products were allowed to settle, and the supernatant solution was removed by decantation. The solids were reslurried with fresh hexane. The decantation procedure was repeated two more times to remove most of the hexane soluble reaction products. The hydrocarbon insoluble products were slurried with hexane to give a total volume of 800 ml. One-half of this slurry (400 ml) was mixed with 44.0 ml of titanium tetrachloride (400 millimoles) and 274 ml of 1.46 molar diethylaluminum chloride in hexane was added dropwise to the stirred mixture over a period of about one hour. The resultant mixture was stirred for one additional hour, the hydrocarbon insoluble products were allowed to settle, and the supernatant solution was removed by decantation. The solids were reslurried with fresh hexane. The decantation procedure was repeated five more times to remove the hydrocarbon soluble products. An aliquot of catalyst slurry was diluted with Isopar ®E to give a slurry that was 0.001 molar in titanium.

B. Polymerization of Ethylene

A 1.8 liter stirred stainless steel reactor containing 1.0 liter of dry, oxygen-free Isopar ®E and 0.54 ml of 0.921 molar triethylaluminum (0.50 millimole) in hexane was vented to zero psig. The reactor was heated to 150° C. and hydrogen added to give a reactor pressure of 25 psig. Then ethylene was added to the reactor to a pressure of 120 psig. The catalyst (25 ml of 0.001 molar slurry in Isopar ®E) prepared in Example 29(A) was pressured into the reactor using nitrogen. The reactor temperature was maintained at 150° C. by heating or cooling and the reactor pressure was maintained at 145 psig by adding ethylene. After 15 minutes, 0.27 ml of 0.921 molar triethylaluminum (0.25 millimole) in hexane diluted to about 10 ml with Isopar ®E was pressured into the reactor with nitrogen. After 15 minutes the reactor contents was cooled to room temperature, the reactor contents filtered, and the polyethylene dried in a vacuum overnight at about 60° C. to yield 35.0 grams of polyethylene having a melt index of 0.48. The catalyst efficiency was 29,200 grams of polyethylene per gram of titanium.

EXAMPLE 30

A. Catalyst Preparation:

A solution (4.14 parts by weight, pbw) of butylethylmagnesium containing 2.40 weight percent magnesium in heptane and a solution (2.19 pbw) of 20.3 weight percent triisobutylaluminum in hexane were mixed in a stirred, jacketed reactor. The solution temperature was maintained at below 40° C. while 1.00 pbw of n-propylalcohol and 6.33 pbw of hexane were added. The resultant solution temperature was maintained at 35° C. while 3.08 pbw of titanium tetrachloride was slowly added. The resultant slurry was cooled to about 25° C., the solids allowed to settle, and the supernatant liquid removed by decantation. The solids were reslurried with fresh hexane and the decantation procedure repeated until less than 10 mole percent of the total titanium content is in solution. The resultant slurry after the decantations was 140 millimolar in magnesium and had a total weight of 6.84 pbw. Titanium tetrachloride (0.59 pbw) was added to the stirred slurry. A 25 weight percent diethylaluminum chloride solution (1.64 pbw) in hexane was slowly added to the stirred mixture. The solids were allowed to settle and the supernatant liquid removed by decantation. The solids were reslurried with fresh hexane and the decantation procedure repeated several times to remove the hydrocarbon soluble species.

B. Polymerization:

The catalyst prepared in Example 30(A) was diluted with hexane to 0.3 millimolar in titanium. This diluted catalyst was then added at a rate of about 12 pbw per hour to a partially full agitated reactor. Simultaneously, 100 pbw of ethylene per hour, 1 pbw of butene-1 per hour and 223 pbw of hexane per hour were added to the reactor while the reactor temperature and pressure were controlled at 85° C. and 170 psig respectively. A two weight percent solution of triisobutylaluminum in hexane was added at a rate so as to give an Al/Ti atomic ratio of about 50:1 in the reactor. Hydrogen was added to the gaseous phase of the reactor so as to obtain the desired polymer melt index. The reactor contents were continuously removed, the polymer and hexane separated, and the dried polymer collected. The polymer had a melt index of 11. The catalyst efficiency was about 400,000 pounds of polymer per pound of titanium.

EXAMPLE 31

A. Catalyst Preparation:

A solution of 50 ml of 0.5 molar anhydrous cobalt dichloride (25 millimoles) in n-propylalcohol was added dropwise to 526 ml of a stirred solution of 0.475 molar dibutylmagnesium (250 millimoles). A solution of 55 ml titanium tetrachloride (500 millimoles) in 100 ml of hexane was added dropwise to the resulting slurry. The solids were allowed to settle and the supernatant liquid removed by decantation. Fresh hexane was added and the decantation procedure was repeated five more times to remove the hexane soluble species. Titanium tetrachloride (55 ml, 500 millimoles) was added to the stirred hexane slurry and then 342 ml of a 1.46 molar diethylaluminum chloride solution was added dropwise. The solids were allowed to settle and the supernatant liquid removed by decantation. Fresh hexane was added and the decantation procedure was repeated five more times to remove the hexane soluble species.

B. Polymerization of Ethylene:

Triisobutylaluminum (0.49 ml of 0.616 molar; 0.30 millimole) and then an aliquot of catalyst containing 0.015 millimoles of Ti, prepared in (A) above, were added to a stirred 1.0 liter stainless steel reactor containing 0.5 liter of dry, oxygen-free hexane. The reactor was pressured to about 50 psig (4 kg/cm$^2$) with hydrogen at room temperature and then vented to 5 psig (0.4 kg/cm$^2$). The pressure venting with hydrogen was repeated 9 times. Then the reactor was heated to 85° C. and the reactor pressure adjusted to 60 psig (4 kg/cm$^2$)

compounds in a quantity sufficient to lower the amount of hydrocarbyl groups present in component (A-1) such that the resultant product does not substantially reduce $TiCl_4$ at a temperature about 25° C.; and optionally (2) (b) having dissolved or dispersed in component (I-A-2-a) one or more transition metal compound(s) represented by the formula $Tm'Y_nX_{z-n}$ wherein Tm' is a transition metal selected from groups I-B, IV-B, V-B, VI-B, VII-B or VIII of the Periodic Table of the Elements and is not the same element as that represented by Tm in component (II); Y is oxygen, OR" or $NR_2''$; each R" is independently hydrogen or a hydrocarbyl group having from 1 to about 20 carbon atoms; X is a halogen atom; z has a value corresponding to the valence of the transition metal Tm'; n has a value of from zero to 5; the value of z-n is from zero up to the valence of the transition metal Tm'; and wherein said transition metal compound, when present, is present in a quantity such that the Tm':Tm, from component II, atomic ratio is from 0.01:1 to about 0.5:1; and (B) a suitable halide source or mixture thereof represented by the formulas $AlR_{3-a}X_a$, $SiR_{4-b}X_b$, $SnR_{4-b}X_b$, $POX_3$, $PX_3$, $PX_5$, $SO_2X_2$, $GeX_4$, $R^4(CO)X$, $TmY_nX_{z-n}$ and $R^4X$ wherein each R is independently a hydrogen, a hydrocarbyl or a hydrocarbyloxy group having from 1 to about 20 carbon atoms; each $R^4$ is independently hydrogen or a hydrocarbyl group having from 1 to about 20 carbon atoms; each X is a halogen atom; a has a value of from 1 to 3; b has a value of from 1 to 4, Tm is a metal selected from groups IV-B, V-B and VI-B of the Periodic Table of elements; Y is oxygen, OR" or $NR''_2$; each R" is independently hydrogen or a hydrocarbyl group having from 1 to about 20 carbon atoms, z has a value equal to the valence of said transition metal, n has a value of from zero to 5 with the value of z-n being from at least 1 up to a value equal to the valence of the transition metal; said halide source being present at least in a quantity sufficient to convert essentially all of the groups attached to a magnesium atom in component (A) to a halide group;

(II) a transition metal compound represented by the formula $TmY_nX_{z-n}$ wherein Tm, Y, X, z and n are as defined above; z-n has a value from zero up to the valence of Tm in a quantity so as to provide a Mg:Tm atomic ratio of from about 0.05:1 to about 50:1; and (III) a suitable reducing agent or mixture of reducing agents represented by the formulas $B(R^3)_{3-m}X_m$, $Al(R^3)_{3-m}X_m$, $ZnR^3X$, $ZnRhu_3 2$, $MgR^3X$ or $MgR^3_2$ wherein each X is independently a halogen, a hydrocarbyloxy group having from 1 to about 20 carbon atoms or an $NR^3_2$ group; each $R^3$ is independently hydrogen or a hydrocarbyl group having from 1 to about 20 carbon atoms each; m has a value from zero to 2; said reducing agent being employed in a quantity so as to provide an $R^3$:Tm ratio of from about 1:1 to about 50:1;

with the proviso that when component (I-B), the halide source, contains a sufficient quantity of transition metal to satisfy the Mg:Tm ratio, then component (II) may be omitted; and with the further proviso that when said halide source, component (I-B), contains a reducing aluminum halide in a quantity so as to satisfy the $R^3$:Tm ratio, then component III may be omitted.

14. The catalyst of claim 13 wherein in component (A-1) each R and R' group is independently an aliphatic hydrocarbon group having from 1 to about 10 carbon atoms; Me is Al and x' has a value of 3; component (A-2) is water, carbon monoxide, carbon dioxide, sulfur dioxide, an organic oxygen-containing compound selected from acetals, ketals, esters of carboxylic acids, orthoesters of carboxylic acids, halides of carboxylic acids, carboxylic acid anhydrides, carbonates, glycols, alcohols, aldehydes, ketones and carboxylic acids or mixture thereof in any combination; the halide source is represented by the formula $AlR_{3-a}X_a$ or $TmY_nX_{z-n}$; in component (II) Y is OR"; the reducing agent, when present, is represented by the formula $AlR^3_{3-m}X_m$; the Mg:Tm atomic ratio is from about 0.1:1 to about 5:1; and the reducing agent, when present, is present in a quantity so as to provide a $R^3$:Tm ratio of from about 1:1 to about 10:1; and when component (I-A-2-b) is present, the Tm':Tm ratio is from about 0.02:1 to about 0.2:1; and component (I-A-2-b), when present, is $NiCl_2$, $NiCl_2 \cdot 6H_2O$, $FeCl_3$, $FeCl_3 \cdot 6H_2O$, $CrCl_3$, $CrCl_2$, $CrCl_3 \cdot 6H_2O$, $MoCl_5$, $WCl_6$, $ZnCl_4$, $Zr(O-iC_3H_7)_4$, $VOCl_3$ or mixture thereof in any combination.

15. The catalyst of claim 14 wherein R and R' and the value of x are such that the organo magnesium component is hydrocarbon soluble; component (A-2) is carbon dioxide, an organic oxygen-containing compound selected from alcohol, aldehydes, ketones and carboxylic acids or mixture thereof in any combination; the halide source is $TiCl_4$; component (II) is omitted; in the formula for the reducing agent, when present, each $R^3$ is independently an aliphatic hydrocarbon group having from 1 to about 10 carbon atoms, each X is chlorine, m has a value of zero or 1; the atomic ratio of Mg:Ti is from about 0.2:1 to about 1:1 and the reducing agent, when present, is employed in a quantity so as to provide an $R^3$:Ti ratio of from about 1:1 to about 3:1 and component (I-A-2-b) is not present.

16. The catalyst of claim 15 wherein the value of x and each R and R' is such that the reaction product (A) is hydrocarbon soluble; component (A-2) is an alcohol or mixture of alcohols having from 1 to about 20 carbon atoms.

17. The catalyst of claim 16 wherein said alcohol is methyl alcohol, ethyl alcohol, n-propyl alcohol, isopropyl alcohol, n-butyl alcohol, sec-butyl alcohol, tert-butyl alcohol, octadecyl alcohol, phenol, 2,6-di-tert-butyl-4-methylphenol, or mixture thereof in any combination.

18. The catalyst of claim 17 wherein said alcohol is methyl alcohol, ethyl alcohol, n-propyl alcohol, isopropyl alcohol or n-butyl alcohol.

19. The catalyst of claim 13 wherein component (A-2) is ammonia, an amine, a nitrile, an amide, an oxime, an imide, an isocyanate or a mixture thereof in any combination.

20. The catalyst of claim 19 wherein component (A-2) is ammonia or an amine.

21. A process for preparing a hydrocarbon insoluble catalyst, which process comprises:
(I) reacting in an inert diluent
(A) the reaction product of
(1) an organomagnesium component or a mixture or complex thereof represented by the formula $MgR^2 \cdot xMeR'_{x'}$ wherein each R is independently a hydrocarbyl group having from 1 to about 20 carbon atoms, each R' is independently hydrogen, a hydrocarbyl or a hydrocarbyloxy group having from 1 to about 20 carbon atoms, Me is Al, Zn or B, x has a value of from zero to about 10; and x' has a value equal to the valence of Me; and (2) (a) an oxygen-containing compound, nitrogen-containing compound or mixture of such compounds in a quantity sufficient to lower the amount of hydrocarbyl groups present in component (A-1) such that the resultant product does not substantially reduce TiCl$_4$ at a temperature of about 25° C.; and optionally (2) (b) having disolved or dispersed in component (I-A-2-a) one or more transition metal compound(s) represented by the formula Tm'$Y_nX_{z-n}$ wherein Tm' is a transition metal selected from groups I-B, IV-B, V-B, VI-B, VII-B or VIII of the Periodic Table of the Elements and is not the same element as that represented by Tm in component (II); Y is oxygen, OR" or NR"$_2$; each R" independently hydrogen or a hydrocarbyl group having from 1 to about 20 carbon atoms; X is a halogen atom; z has a value corresponding to the valence of the transistion metal Tm'; n has a value of from zero to 5; the value of z-n is from zero up to the valence of the transition metal Tm'; and wherein said transition metal compound, when present, is present in a quantity such that the Tm':Tm, from component II, atomic ratio is from 0.01:1 to about 0.5:1; and (B) a suitable halide source or mixture thereof represented by the formulas AlR$_{3-a}$X$_a$, SiR$_{4-b}$X$_b$, SnR$_{4-b}$X$_b$, POX$_3$, PX$_3$, PX$_5$, SO$_2$X$_2$, GeX$_4$, R$^4$(CO)X, TmY$_n$X$_{z-n}$ and R$^4$X wherein each R is independently hydrogen, a hydrocarbyl or a hydrocarbyloxy group having from 1 to about 20 carbon atoms; R$^4$ is independently hydrogen or a hydrocarbyl group having from 1 to about 20 carbon atoms; each X is a halogen atom; a has a value of from 1 to 3; b has a value of from 1 to 4; Tm is a metal selected from groups IV-B, V-B and VI-B of the Periodic Table of Elements; Y is oxygen, OR" or NR"$_2$; each R" is independently hydrogen or a hydrocarbyl group having from 1 to about 20 carbon atoms; z has a value equal to the valence of said transition metal, n has a value of zero to 5 with the value of z-n being from at least 1 up to a value equal to the valence of the transition metal; said halide source being present in a quantity sufficient to convert essentially all of the groups attached to a magnesium atom in component (A) to a halide group;

(II) recovering the resultant hydrocarbon insoluble product, washing said product with fresh inert diluent; and mixing the resultant washed product with fresh inert diluent; and (III) combining the product from (II) with (C) a transition metal compound represented by the formula TmY$_n$X$_{z-n}$ wherein Tm, Y, X, z and n are as defined as above; z-n has a value of from zero up to the valence of Tm; in a quantity so as to provide a Mg:Tm atomic ratio of from about 0.05:1 to about 50:1;

(IV) reacting the product from (III) with (D) a suitable reducing agent or mixture of reducing agents selected from compounds represented by the formulas B(R$^3$)$_{3-m}$X$_m$, Al(R$^3$)$_{3-m}$X$_m$, ZnR$^3$X, ZnR$^3_2$, MgR$^3$X or MgR$^3_2$ wherein each X is a halogen or a hydrocarbyloxy group having from 1 to about 20 carbon atoms or an NR$^3_2$ group; each R$^3$ is independently hydrogen or a hydrocarbyl group having from 1 to about 20 carbon atoms; m has a value from zero to 2; said reducing agent being employed in a quantity so as to provide an R$^3$:Tm ratio of from about 1:1 to about 50:1; and (V) recovering and washing with fresh inert diluent the resultant solid hydrocarbon insoluble catalyst produced in step IV; and with the proviso that when said halide source, component (I-B), is a reducing aluminum halide and is employed in a quantity such that the R$^3$:Tm ratio is satisfied, then steps II and IV may be omitted.

22. The process of claim 21 wherein in component (A-1), each R and R' group is independently an aliphatic hydrocarbon having from 1 to about 10 carbon atoms, Me is Al and x' has a value of 3; component (A-2) is water, carbon monoxide, carbon dioxide, sulfur dioxide, an organic oxygen-containing compound selected from, acetals, ketals, esters of carboxylic acids, orthoesters of carboxylic acids, halides of carboxylic acids, carboxylic acid anhydrides, carbonates, glycols, alcohols, aldehydes, ketones, carboxylic acids or mixture thereof in any combination; the halide source is represented by the formulas AlR$_{3-a}$X$_a$ or TmY$_n$X$_{z-n}$; in component (C) Y is OR"; the reducing agent, when present, is represented by the formula AlR$^3_{3-m}$X$_m$; the Mg:Tm atomic ratio is from about 0.1:1 to about 5:1; and the reducing agent, when present, is present in a quantity so as to provide a R$^3$:Tm ratio of from about 1:1 to about 10:1; when component (I-A-2-b) is present, the Tm':Tm ratio is from about 0.02:1 to about 0.2:1; and component (I-A-2-b), when present, is NiCl$_2$, NiCl$_2$.6H$_2$O, FeCl$_3$, FeCl$_3$.6H$_2$O, CrCl$_3$, CrCl$_2$, CrCl$_3$.6H$_2$O, MoCl$_5$, WCl$_6$, ZnCl$_4$, Zr(O-iC$_3$H$_7$)$_4$, VOCl$_3$ or mixture thereof in any combination.

23. The process of claim 22 wherein R, R' and the value of x are such that the organomagnesium component is hydrocarbon soluble; component (A-2) is carbon dioxide, an organic oxygen-containing compound selected from alcohols, aldehydes, ketones, and carboxylic acids or mixture thereof in any combination; the halide source is represented by the formula TiCl$_4$; component (C) is TiCl$_4$; in the formula for the reducing agent, when present, each R$^3$ is independently an aliphatic hydrocarbon group having from 1 to about 10 carbon atoms, each X is chlorine, m has a value of zero or 1; the atomic ratio of Mg:Ti is from about 0.2:1 to about 1:1 and the reducing agent, when present, is employed in a quantity so as to provide an R$^3$:Ti ratio of from about 1:1 to about 3:1; and component (I-A-2-b) is not present.

24. The process of claim 23 wherein the value of x and each R and R' is such that the reaction product (A) is hydrocarbon soluble; the component (A-2) is an alcohol or mixture of alcohols having from 1 to about 20 carbon atoms.

25. The process of claim 24 wherein said alcohol ;' ' is methyl alcohol, ethyl alcohol, n-propyl alcohol, isopropyl alcohol, n-butyl alcohol, sec-butyl alcohol, tert-butyl alcohol, octadecyl alcohol, phenol, 2,6-di-tert-butyl-4-methylphenol, or mixture thereof in any combination.

26. The process of claim 25 wherein said alcohol is methyl alcohol, ethyl alcohol, n-propyl alcohol, isopropyl alcohol, n-butyl alcohol or mixture thereof in any combination.

27. The process of claim 21 wherein component (A-2) is ammonia, an amine, a nitrile, an amide, an oxime, an imide, an isocyanate or a mixture thereof in any combination.

28. The process of claim 27 wherein component (A-2) is ammonia or an amine.

29. The catalyst prepared by the process of claim 21, 22, 23, 23, 25, 26, 27 or 28.

* * * * *

UNITED STATES PATENT AND TRADEMARK OFFICE
CERTIFICATE OF CORRECTION

PATENT NO. : 4,496,660

DATED : January 29, 1985

INVENTOR(S) : Donald E. Gessell, Ronald L. Gibbs and Ricardo Fuentes, Jr.

It is certified that error appears in the above-identified patent and that said Letters Patent is hereby corrected as shown below:

Col. 4, line 23; delete the first occurrence of "wherein".

Col. 4, line 53; delete the second occurrence of "the".

Col. 13, line 36; change "amd" to --and--.

Col. 16, line 50; change "decantion" to --decantation--.

Col. 16, line 54; change "titantium" to --titanium--.

Col. 18, line 34; change "contining" to --containing--.

Col. 18, line 38; change "trisobutylaluminum" to --triisobutyl-aluminum--.

Col. 18, line 45; change "decantaions" to --decantations--.

Col. 18, line 58; change "triisobutyl-aluminum" to --triisobutylaluminum--.

UNITED STATES PATENT AND TRADEMARK OFFICE
CERTIFICATE OF CORRECTION

PATENT NO. : 4,496,660

DATED : January 29, 1985

INVENTOR(S) : Donald E. Gessell, Ronald L. Gibbs and Ricardo Fuentes, Jr.

It is certified that error appears in the above-identified patent and that said Letters Patent is hereby corrected as shown below:

Col. 19, line 13; change "mintues," to --minutes,--.

Col. 19, line 20; change "mintues," to --minutes,--.

Col. 19, line 56; change "mintutes" to --minutes--.

Col. 20, line 24; change "mintues," to --minutes,--.

Col. 22, line 37; change "decated," to --decanted,--.

Col. 24, line 31; change "eqipped" to --equipped--.

Col. 24, line 43; delete the second occurrence of "in".

Col. 26, line 55; change "wise," to --wise.--.

Col. 27, line 24; change "hloride" to --chloride--.

Col. 27, line 27; change "decantaion." to --decantation.--.

UNITED STATES PATENT AND TRADEMARK OFFICE
CERTIFICATE OF CORRECTION

PATENT NO. : 4,496,660

DATED : January 29, 1985

INVENTOR(S) : Donald E. Gessell, Ronald L. Gibbs and Ricardo Fuentes, Jr.

It is certified that error appears in the above-identified patent and that said Letters Patent is hereby corrected as shown below:

Col. 27, line 66; change "decantaion." to --decantation.--.

Col. 30, line 44; change "dibutylmagesium" to --dibutylmagnesium--.

Col. 31, line 52, Claim 1; change "from." to --from--.

Col. 32, line 30, Claim 7; change "oxygencon-" to --oxygen-con- --.

Col. 32, line 65, Claim 13; change "X'" to --x'--.

Col. 33, line 5, Claim 13; insert --of-- between "temperature" and "about".

Col. 33, line 36, Claim 13; change "elements;" to --Elements;--.

Col. 33, line 56, Claim 13; change "ZnRhu $3_2$," to --ZnR$^3_2$,--.

Col. 33, line 67, Claim 13; change "Mg;Tm" to --Mg:Tm--.

Col. 34, line 31, Claim 15; change "alcohol," to --alcohols,--.

UNITED STATES PATENT AND TRADEMARK OFFICE
CERTIFICATE OF CORRECTION

PATENT NO. : 4,496,660

DATED : January 29, 1985

INVENTOR(S) : Donald E. Gessell, Ronald L. Gibbs and Ricardo Fuentes, Jr.

PAGE 4 OF 4

It is certified that error appears in the above-identified patent and that said Letters Patent is hereby corrected as shown below:

Col. 35, line 15, Claim 21; change "disolved" to --dissolved--.

Col. 35, line 23, Claim 21; insert --is-- between "R'"" and "independently".

Col. 35, line 27, Claim 31; change "transistion" to --transition--.

Col. 36, line 18, Claim 22; change "Tne" to --The--.

Col. 36, line 63, Claim 25; change "alcohol;" " to --alcohol--.

Col. 38, line 6, Claim 29; change second occurrence of "23," to --24,--.

Signed and Sealed this

Seventh Day of January 1986

[SEAL]

Attest:

DONALD J. QUIGG

Attesting Officer

Commissioner of Patents and Trademarks